(12) United States Patent
Shebanow et al.

(10) Patent No.: US 8,860,742 B2
(45) Date of Patent: Oct. 14, 2014

(54) COVERAGE CACHING

(75) Inventors: Michael C. Shebanow, Saratoga, CA (US); Anjul Patney, Davis, CA (US)

(73) Assignee: NVIDIA Corporation, Santa Clara, CA (US)

( * ) Notice: Subject to any disclaimer, the term of this patent is extended or adjusted under 35 U.S.C. 154(b) by 282 days.

(21) Appl. No.: 13/462,759

(22) Filed: May 2, 2012

(65) Prior Publication Data

US 2012/0281004 A1 Nov. 8, 2012

Related U.S. Application Data

(60) Provisional application No. 61/481,676, filed on May 2, 2011.

(51) Int. Cl.
*G09G 5/36* (2006.01)
*G09G 5/00* (2006.01)

(52) U.S. Cl.
CPC .................................. *G09G 5/36* (2013.01)
USPC ............ 345/557; 345/556; 345/613; 345/614

(58) Field of Classification Search
None
See application file for complete search history.

(56) References Cited

U.S. PATENT DOCUMENTS

| | | | | |
|---|---|---|---|---|
| 5,123,085 A * | 6/1992 | Wells et al. | ................... | 345/421 |
| 5,287,438 A * | 2/1994 | Kelleher | ........................ | 345/613 |
| 5,446,836 A | 8/1995 | Lentz et al. | | |
| 5,696,944 A * | 12/1997 | Krech, Jr. | ........................ | 345/539 |
| 5,786,826 A | 7/1998 | Kwok | | |
| 5,856,829 A * | 1/1999 | Gray et al. | ..................... | 345/422 |
| 6,633,299 B1 * | 10/2003 | Sreenivas et al. | ............. | 345/557 |
| 6,636,232 B2 * | 10/2003 | Larson | ........................... | 345/611 |
| 7,061,495 B1 | 6/2006 | Leather | | |
| 7,170,515 B1 | 1/2007 | Zhu | | |
| 2005/0212806 A1 * | 9/2005 | Koselj et al. | ................... | 345/522 |
| 2007/0139440 A1 * | 6/2007 | Crow et al. | .................... | 345/614 |
| 2007/0296725 A1 | 12/2007 | Steiner et al. | | |

OTHER PUBLICATIONS

Eyles, et al., "Pixel-Planes 4: A Summary" In Advances in Computer Graphics Hardware II (Eurographics '87 Workshop), Springer-Verlag, London, UK, 1987 pp. 183-207.
Fiume, et al., "A Parallel Scan Conversion Algorithm with Anti-Aliasing for a General-Purpose Ultracomputer" Computer Graphics, vol. 17, No. 3, Jul. 1983, pp. 141-150.
Ned Greene, "Hierarchical Polygon Tiling with Coverage Masks", Apple Computer, in Proceedings of SIGGRAPH 96, Computer Graphics Proceedings, Annual Conference Series, 1996, pp. 65-74.
Juan Pineda, "A Parallel Algorithm for Polygon Rasterization", Computer Graphics, vol. 22, No. 4, Aug. 1988 pp. 17-20.
Roca, et al., "A SIMD-efficient 14 instruction shader program for high-throughput microtriangle rasterization", The Visual Computer 26, Jun. 6-8, 2010, pp. 707-719.

* cited by examiner

*Primary Examiner* — Maurice L McDowell, Jr.
*Assistant Examiner* — Donna J Ricks
(74) *Attorney, Agent, or Firm* — Patterson & Sheridan, LLP

(57) ABSTRACT

A technique for caching coverage information for edges that are shared between adjacent graphics primitives may reduce the number of times a shared edge is rasterized. Consequently, power consumed during rasterization may be reduced. During rasterization of a first graphics primitive coverage information is generated that (1) indicates cells within a sampling grid that are entirely outside an edge of the first graphics primitive and (2) indicates cells within the sampling grid that are intersected by the edge and are only partially covered by the first graphics primitive. The coverage information for the edge is stored in a cache. When a second graphics primitive is rasterized that shares the edge with the first graphics primitive, the coverage information is read from the cache instead of being recomputed.

20 Claims, 19 Drawing Sheets

On-Edge, Outside
 On-Edge, Inside

Outside
 Inside

T-junction 801

COVERAGE CACHING

CROSS-REFERENCE TO RELATED APPLICATIONS

This application claims priority benefit to United States provisional patent application titled, "COVERAGE CACHING," filed on May 2, 2011 and having Ser. No. 61/481,676. The related application is hereby incorporated by reference in its entirety.

BACKGROUND OF THE INVENTION

1. Field of the Invention

The present invention generally relates to processing graphics primitives, and, more specifically to caching coverage information.

2. Description of the Related Art

In graphics processors, rasterization is the process of converting screen-space triangles into a set of samples (pixels) covered by that triangle. Rasterization is one of the most computationally demanding stages in the graphics processing pipeline, and, as parallelism has increased within the graphics processing pipeline, the dedicated hardware rasterizers have become increasingly parallel. A typical technique that is used to increase rasterization parallelism is to test, in parallel, every sample within a given screen-space region, such as a tile, against each triangle in a model, where a different unit within the rasterizer is responsible for testing each of the different samples.

Increasingly, graphics applications are modeling objects using triangle meshes where adjacent triangles share an edge. One drawback of conventional highly parallel rasterization techniques is that, the shared edges are sampled twice, once for each one of the two triangles. Therefore, more power is consumed by highly parallel rasterizers when rasterizing triangle meshes and other like graphics constructs compared with less parallel rasterizers.

As the foregoing illustrates, what is needed in the art is a technique that reduces the amount of power consumed by highly parallel rasterizers when rasterizing graphics constructs that share edges, like triangle meshes.

SUMMARY OF THE INVENTION

One embodiment of the present invention sets forth a method for caching graphics primitive edge coverage. The method includes computing a cache read tag for a first edge of a first graphics primitive based on an grid identifier associated with a sampling grid positioned in screen space and an edge identifier associated with the first edge and determining that the cache read tag matches a cache line. Stored coverage information for the first edge is read from the cache line, where the first edge is shared by the first graphics primitive and a second graphics primitive.

One advantage of the disclosed technique is that the number of times shared edges of adjacent graphics primitives are sampled to generate coverage information is minimized. Consequently, rasterization is more efficient in terms of power consumption.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
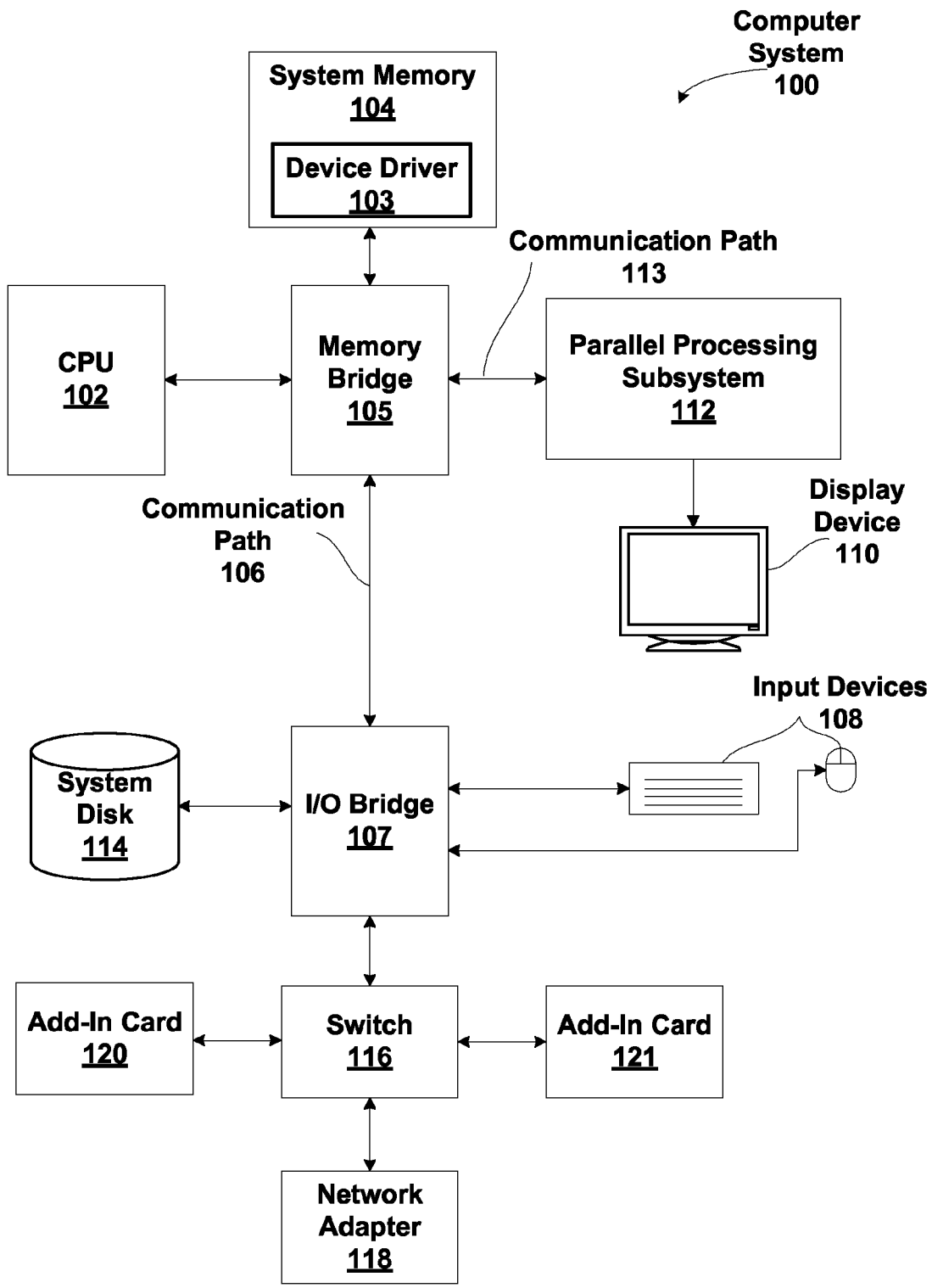
FIG. 1 is a block diagram illustrating a computer system configured to implement one, or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
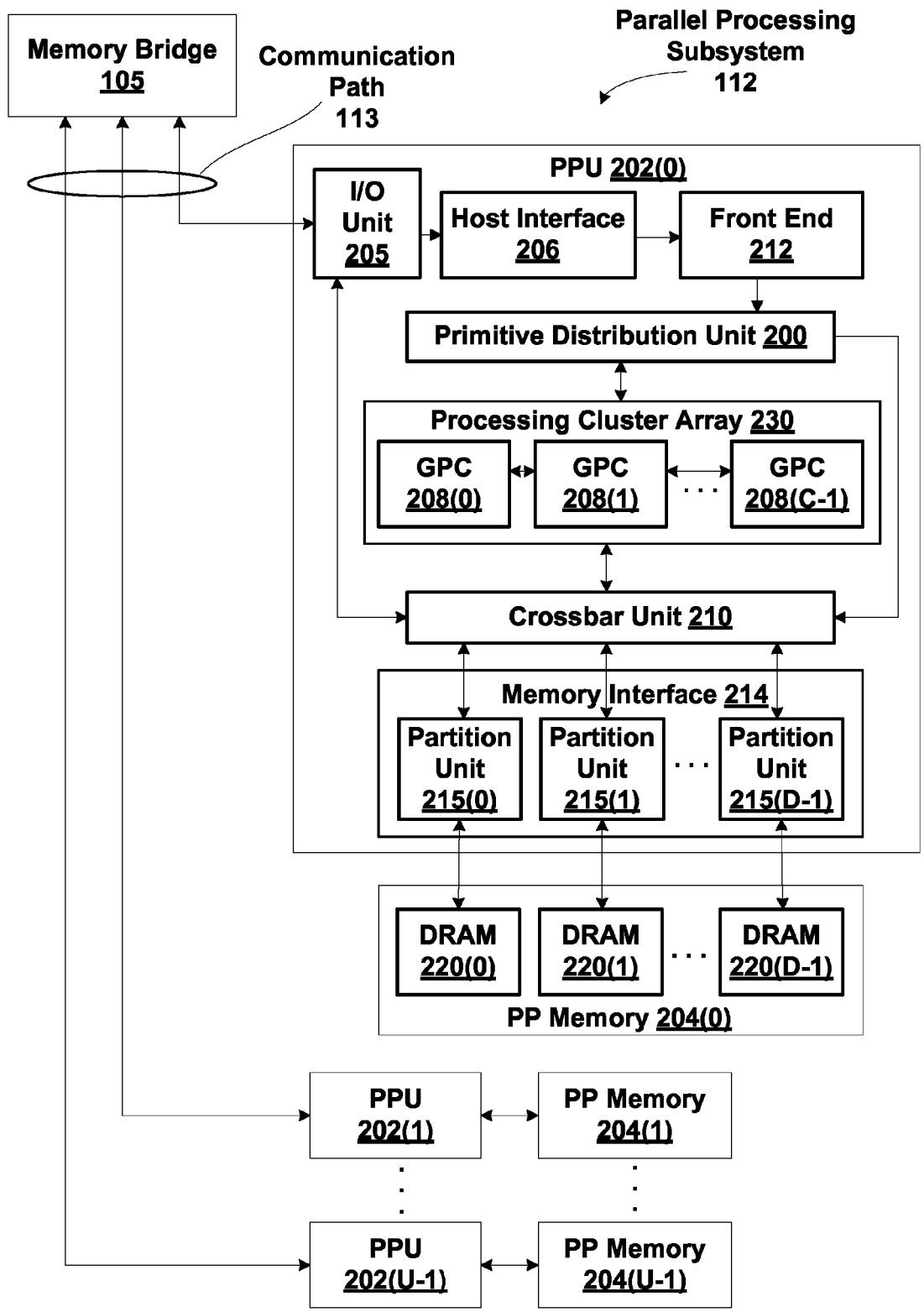
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Primitive distribution unit 200 may be configured to fetch the indices corresponding to the tasks, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
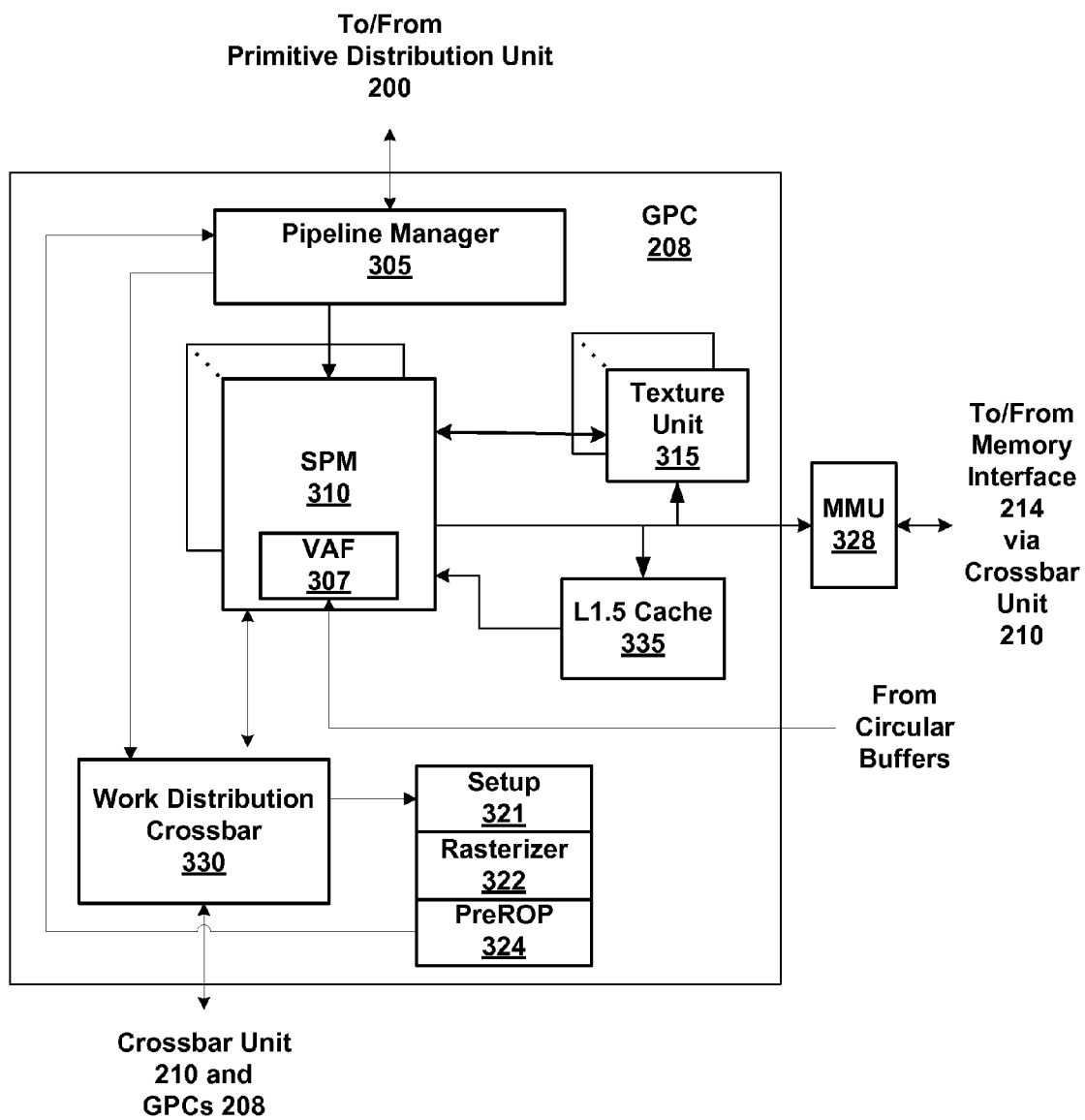
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3B) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Vertex attribute buffers (VABs) are written by the front end unit 212 or the primitive distribution unit 200. Each SPM 310 includes a VAF (vertex attribute fetch unit) 307 that receives VABs from the primitive distribution unit 200. The VABs may be stored in a circular buffer entry in an L2 cache. The vertices are processed by one or more of hull shaders, domain shaders, vertex shaders, and geometry shaders to produce post-geometry processed vertex attributes that are stored in attribute circular buffer entries in the L2 cache.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. Processed graphics data may be displayed on display device 110 or routed for further processing by CPU 102 or by one of the processing entities within parallel processing subsystem 112.

A preROP (pre-raster operations) 325 is configured to receive data from SPM 310, direct data to ROP units within partition units 215, and perform optimizations for color blending, organize pixel color data, and perform address translations. In graphics applications, a raster operations unit is a processing unit that performs raster operations, such as stencil, z test, blending, and the like, and outputs pixel data as processed graphics data for storage in graphics memory. In some embodiments of the present invention, a ROP unit is included within each GPC 208 instead of partition unit 215, and pixel read and write requests are transmitted over crossbar unit 210 instead of pixel fragment data.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons skilled in the art will understand that the architecture described in FIGS. 1, 2, and 3A in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread. ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3B:
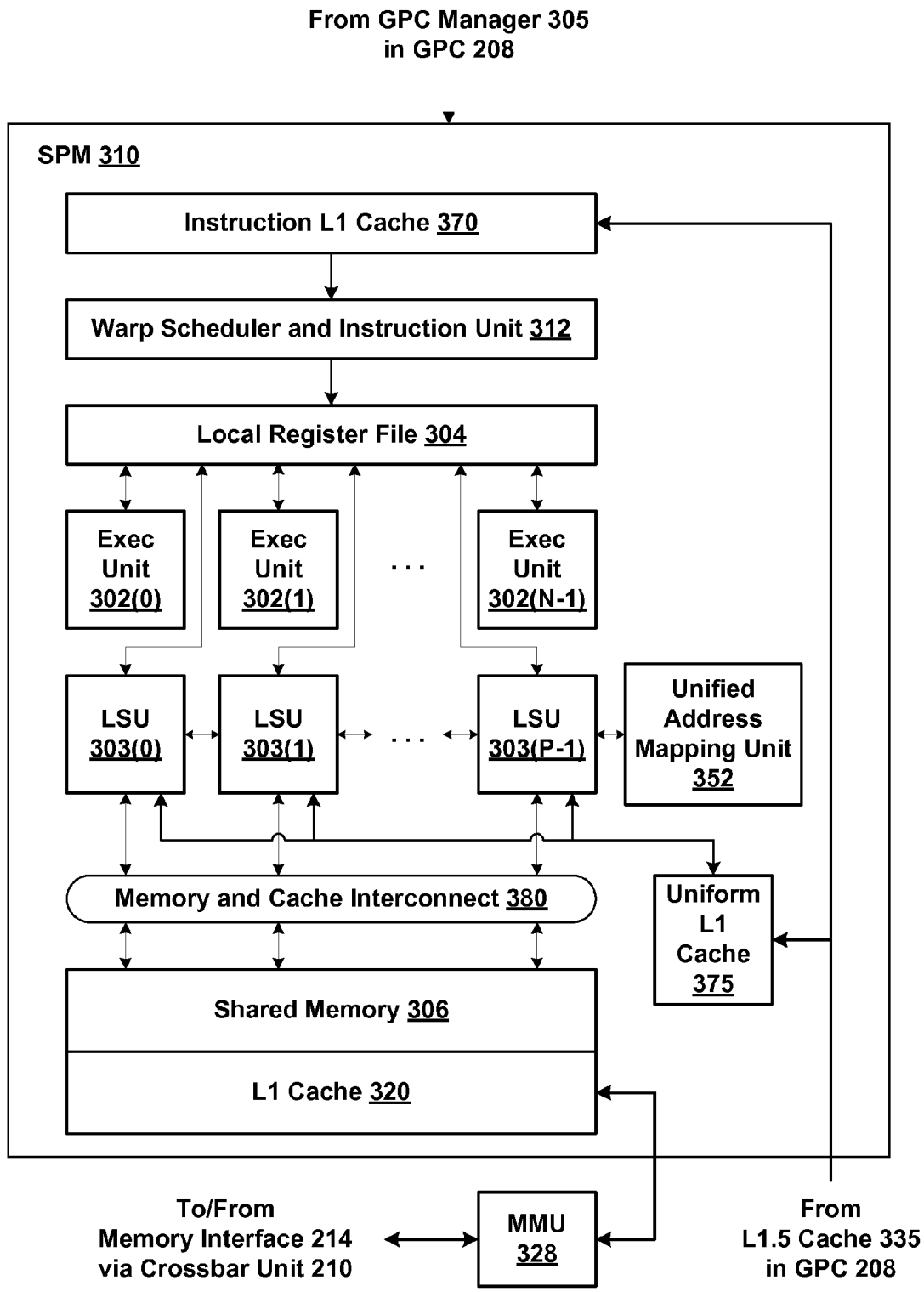
FIG. 3B is a block diagram of a portion of the SPM of FIG. 3A, according to one embodiment of the present invention.

FIG. 3B is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
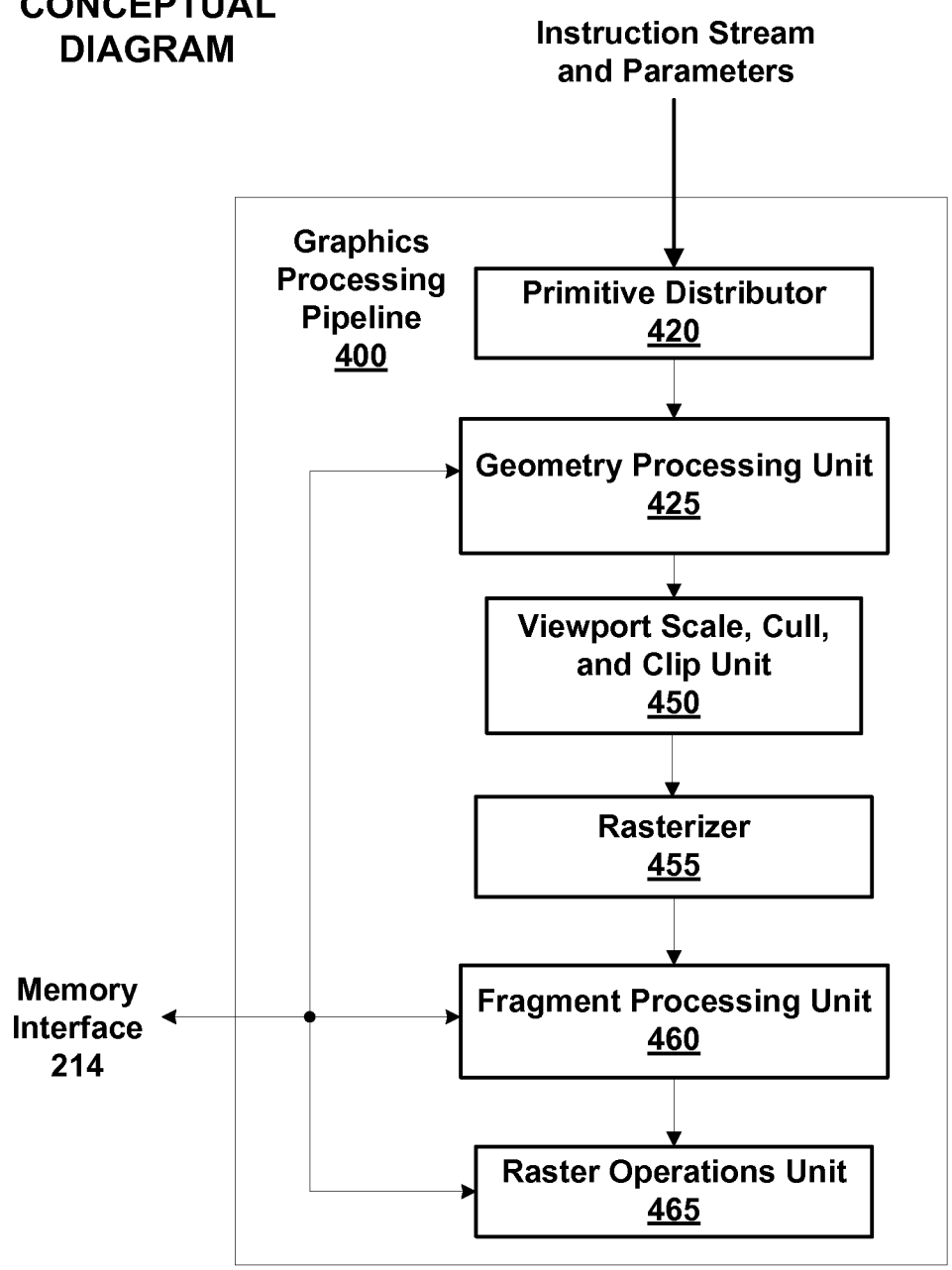
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a geometry processing unit 425, and a fragment processing unit 460. The functions of primitive distributor 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in the L1 cache 320, L1.5 cache 335, an L2 cache (within the partition unit 215), parallel processing memory 204, or system memory 104 and accessed as needed to render the primitives. The functions of the primitive distributor 420 may be performed by the primitive distribution unit 200. Primitive distributor 420 receives pointers to primitive index arrays stored in memory. The entries in these index lists point into lists of vertex attributes (vertex attribute buffers), also stored in memory. Because primitives are stored compactly and many primitives can be passed to the primitive distributor 420 in a single draw call, indexed primitive lists and vertex attribute buffers are the most efficient way to convey geometry to the graphics pipeline 400. The front end 212 may be configured to store legacy inline and immediate mode vertices in vertex attribute buffers, so the primitive assembler 420 only has to deal with this one, efficient type of primitive input data, namely primitive index lists. In other embodiments the primitive distributor 420 may receive the vertex data instead of pointers to primitive index lists.

In some embodiments, the GPCs 208 are configured to perform tessellation processing prior to geometry processing. In those embodiments the primitive distributor 420 distributes batches of primitives for tessellation processing to multiple SPMs 310 and streams of tessellated primitive batches are produced. The API primitive ordering may be restored prior to object-space processing of the primitives by either using the same SPMs 310 to perform the object-space processing as was used to perform the tessellation. Alternatively, the primitive batches may be reordered to match the API primitive order after tessellation so that batches of primitives for object-space processing are generated and distributed in API primitive order.

Primitive distributor 420 dices the index list into self-contained batches of indices specifying up to J vertices and K primitives, such that each vertex in a strip, after the first two, specifies a new triangle. In some embodiments, J is 32, K is 30, and batches may occupy from one to eight 32B data packets, depending on the number and type of primitive and contain the following information: indices of vertex attribute buffers and topology information (which vertices in the batch comprise each primitive). Importantly, the primitive distributor 420 works entirely with primitive indices—it does not touch the vertex data itself. The vertex data is later fetched by the SPM 310 assigned for vertex shading.

The bulk of the data transferred (via indices) between geometry processing and rasterization is vertex attributes. The attributes are the parameters calculated for each vertex, such as x, y, z position, texture coordinates, vertex colors, and other shader parameters. Some parameters, such as x, y, z (position) are needed by the rasterizer to determine primitive coverage and depth values. Other attributes are needed, as interpolated values, by the fragment shader. The number and type of attributes depends on the vertex and fragment shaders.

Vertex attributes need to be buffered from the time they are calculated by the SPMs 310 doing object-space processing until they are needed by the primitive setup unit 321 that computes the z attribute plane equations or the fragment processing unit 460 that computes non-z attribute plane equations and shades the primitives using the plane equations. The amount of data that needs to be buffered is highly variable, depending on the number and type of attributes per vertex. The amount of data may be near zero for full-screen primitives and the amount of data may be extremely high in high primitive rate cases. The amount of data may also be highly variable per GPC 208 when a large number of small primitives fall onto a, single screen tile.

Each SPM 310 performing object-space processing is provided with a fixed size linear buffer that is virtually addressed and cacheable. The addresses used to access these linear buffers wrap, so the linear buffers are actually circular FIFO (first-in, first-out) buffers. As SPMs 310 stream vertex attributes into the circular buffers, the SPMs 310 provide indices for entries written to the work distribution crossbar interface 330, which are conveyed to the GPCs 208 performing the screen-space processing. GPCs 208 that need to read attribute circular buffer entries do so at two points: primitive setup and fragment shader interpolation. Entries that are unneeded by a GPC 208 are skipped—not read by the GPC 208, while other entries may be read by multiple GPCs 208.

Geometry processing unit 425 is a programmable execution unit that is configured to execute vertex, hull, domain, and geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling of primitives that lie outsize of the viewport frustum, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Grid Walk Sampling

The grid walk sampling technique samples each edge of a graphics primitive, e.g., triangle separately and then combines samples from each edge into a complete coverage mask for the graphics primitive. A set of samples that is covered for an edge is defined as, $$S_e = \{\forall s s \cdot t \cdot cover(e,s)\},$$

where cover(e,s) is true for some edge e and a sample location s if s is "inside" e. Given this definition, the set of samples covered by some triangle T is:

$$T = \bigcap_{e=1,2,3} S_e$$

That is, a triangle covers some sample s if and only if all three edges cover that same sample. We limit the domain of samples s to some small R×C grid (R=rows, C=columns) anchored to some arbitrary location in screen space. In one embodiment, any triangle that is larger than the domain is hierarchically processed by walking R×C sized grid tiles. Only partially covered grid tiles are then processed to determine per-sample coverage. The per-sample coverage of fully covered or fully empty grid tiles is trivially computed. The hierarchy enables parallelism for processing efficiency. The grid tile walking technique ensures that only partially covered grid tiles are processed in more detail to reduce power consumption and circuitry compared with a highly parallel architecture.

Figure 5A:
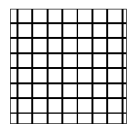
FIG. 5A illustrates a grid tile including 64 cells intersected by 3 edges that form a graphics primitive, according to one embodiment of the present invention.
Figure 5A:
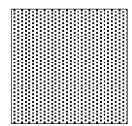
Figure 5A:
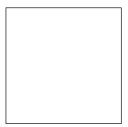
Figure 5A:
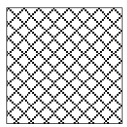
Figure 5A:
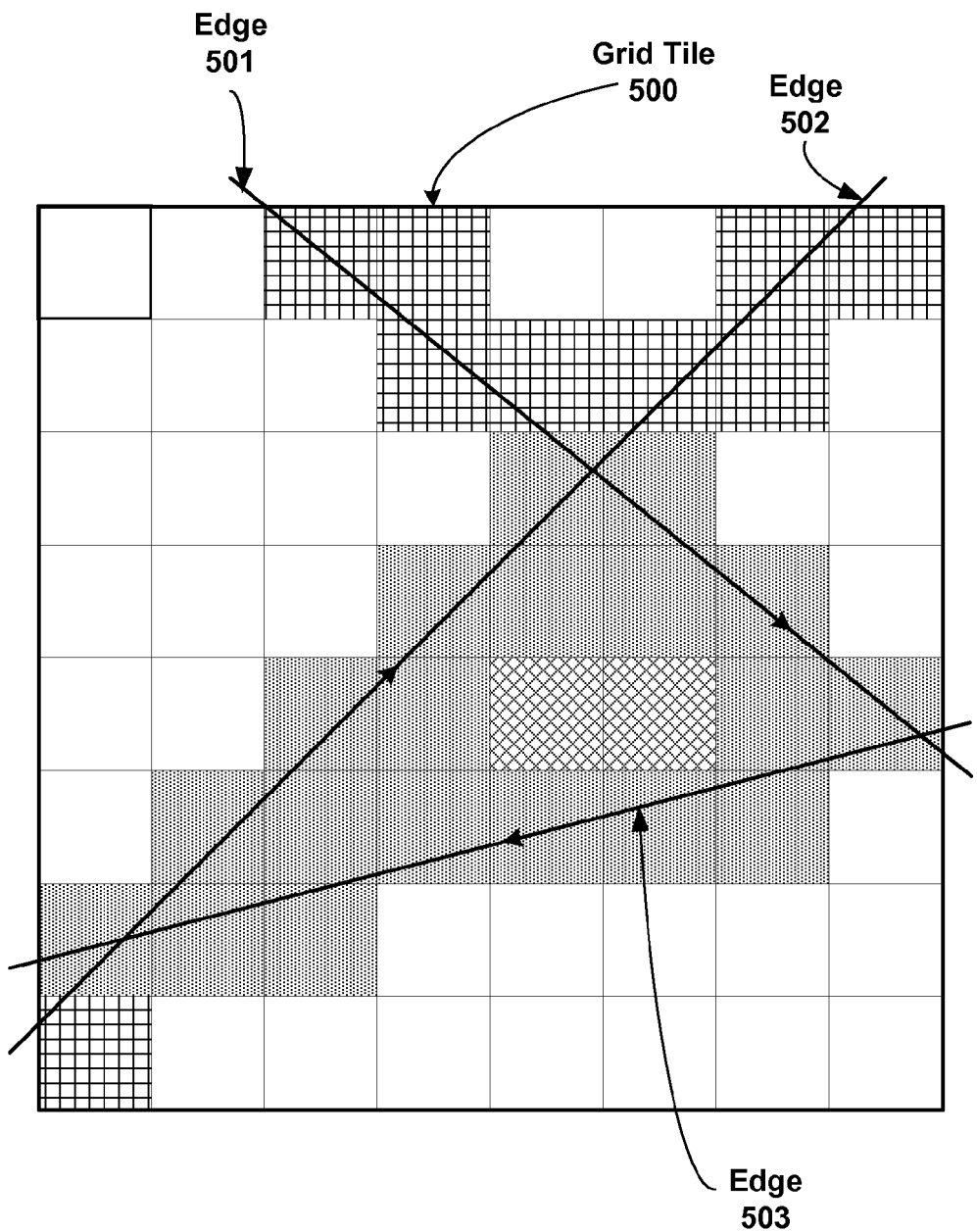

FIG. 5A illustrates a grid tile 500 including 64 cells intersected by 3 edges that form a graphics primitive, e.g., triangle, according to one embodiment of the present invention. The 64 cells are arranged in an 8×8 sampling grid. A conventional highly-parallel rasterizer may rasterize the triangle by testing each of the 64 cells in the grid tile 500 in parallel, delivering high-performance at a high cost in area and power. The grid walk sampling technique exploits the linearity of the computation required for sampling by walking the edges 501, 502, and 503 that form the triangle and derives the coverage state of many of the cells without having to explicitly compute the coverage state for each cell. The edge walking that is performed during grid walk sampling is also amenable to incremental computation, simplifying the computations that are performed during sampling. The ability to derive the coverage state of many cells without "walking" the cells combined with the simplified computations to walk each edge result in a more efficient rasterizer in terms of power consumption and area compared with conventional rasterizers.

The grid tile 500 is modeled as a rectangular arrangement of cells. The cells are rectangular areas of screen space, with $x_{pitch}$ and $y_{pitch}$ denoting the width and height of a cell, measured in pixels. A cell may contain one or more samples, infinitesimal points, at arbitrary locations within each cell. For example, when grid tile 500 is employed for fine sampling, each cell may have an area equal to a single pixel and may contain two or more samples distributed at various locations within the cell. In another example, each cell may have an area equal to a single pixel and may contain a single sample at the center of each cell. In yet another example, when grid tile 500 is employed for coarse sampling, each cell may have an area equal to 16 pixels and may contain one or more samples positioned at the center of each of the 16 pixels.

FIG. 5A shows the cells touched by the grid walk sampling algorithm as the edges 501, 502, and 503 of the triangle are walked. The two different coverage states that an edge cell that is explicitly sampled when an edge is walked are (1) on an edge and outside of the triangle "on-edge, outside" and (2) on an edge and partially, but not entirely, within the triangle "on-edge". The two different coverage states that may be derived for a particular cell that is not on an edge are (1) entirely inside "inside" of the edge that define the triangle and (2) entirely outside "outside" of the edges that define the triangle. The grid walk sampling algorithm infers or derives the coverage state of the cells that are either inside or outside of the edges that define the triangle without needing to sample those cells. While the sampling of an individual edge is sequential, the grid walk sampling algorithm may exploit parallelism across triangle edges and across triangles to achieve a high sampling throughput. The grid walk sampling algorithm may also exploit parallelism across cells for triangles that are larger than one R×C grid tile.

Figure 5B:
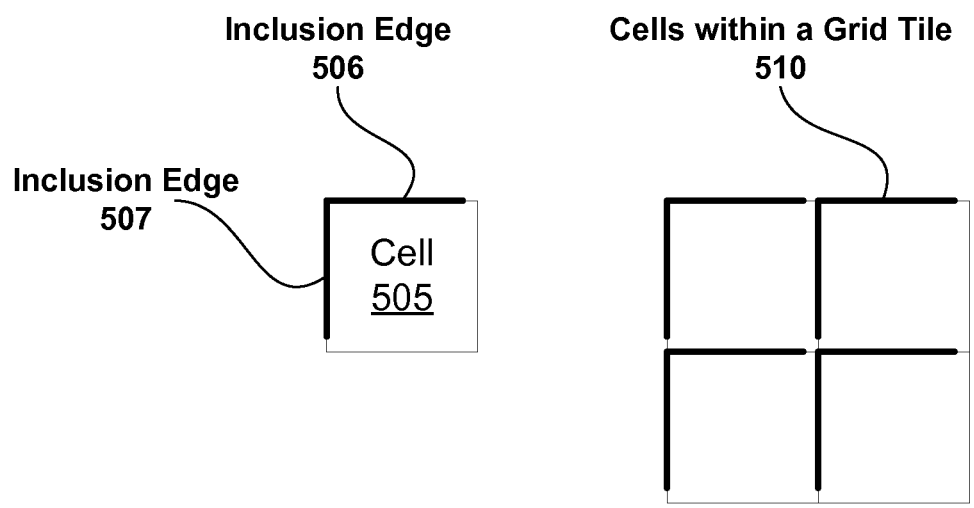
FIG. 5B illustrates a cell having two inclusion edges, cells within a grid tile, and edges intersecting the cell and the cells, according to one embodiment of the present invention.

FIG. 5B illustrates a cell 505 having two inclusion edges, cells within a grid tile 510, according to one embodiment of the present invention. The left edge of the cell 505 has an inclusion edge 507 that does not extend to the lower-left corner of the cell 505, but does include the upper-left corner of the cell 505. Similarly, the top edge of the cell 505 has an inclusion edge 506 that does not extend to the upper-right corner of the cell 505, but that also does include the upper-left corner of the cell 505. The inclusion edges 505 and 506 extend infinitesimally close to the lower-left or upper-right corner of the cell 505, respectively, without including the actual corner. Samples that lie on the inclusion edge 506 and the inclusion edge 507 are included in the cell 505. Samples lying along the right or bottom edge or at the top right, bottom left, or bottom right corner of the cell 505 are not included in the cell 505. Defining the inclusion edges on only two sides of each cell ensures that sample locations on the edges of the cells are not sampled for two different cells within a grid tile 510. An edge inclusion rule specifies that a sample on a particular edge of a cell is included in the cell having an inclusion edge on the particular edge.

Referring back to FIG. 5A, in one embodiment, a coordinate system is defined with y coordinate increasing downward and x coordinate increasing rightward and allege walks proceed from left-to-right (x increasing), or for vertical walks, top-to-bottom (y increasing). Although the definition of edge inclusion rules, coordinate orientation, and cell-walk directions is somewhat arbitrary, any chosen convention must be self-consistent and must ensure that any sample belongs to exactly one cell so as to not under- or over-sample any edge.

To determine if an arbitrary sample location (x, y) lies in the interior of a triangle, a triangle defined by three vertices $\{v_0, v_1, v_2\}$ with $v_i=(x_i; y_i)$ has a clockwise winding order, $v_0 \rightarrow v_1$, $v_1 \rightarrow v_2$, and $v_2 \rightarrow v_0$. Each edge of a triangle is effectively a vector of infinite length oriented in the winding order direction, as shown in FIG. 5A by the arrows along each edge 501, 502, and 503.

Because each such edge-vector divides the plane of the triangle into half planes, a cell is considered to be inside when the sample lies on or to the right of the edge and outside when the cell resides in the left half plane of the edge. When a cell lies inside all three edges, the cell resides in the interior of the triangle. Conversely, a cell that resides outside any edge is in the exterior of the triangle. Graphics APIs such as Windows Direct3D (D3D) additionally define triangle edge inclusion rules that distinguish a sample lying on a particular edge as inside or outside based the edge's relative orientation; in D3D's case, the so-called "top-left rule". These rules ensure that any sample belongs only to one triangle so as to avoid cracks or double sampling.

We can compute inside versus outside for some (sample or) cell (x, y) against some edge $v_0 \rightarrow v_1$ by computing an edge equation E as follows:

$$E(x, y) = (x_1 - x_0)(y - y_0) - (y_1 - y_0)(x - x_0)$$
$$= x_s(y - y_0) - y_s(x - x_0)$$

E is positive when cell (x, y) resides inside the edge-vector, negative when cell (x, y) resides outside the edge-vector, and zero when cell (x, y) lies on-edge. The grid walk sampling technique may conservatively sample a triangle against some grid as a process that iteratively performs a grid walk across all three edges 501, 502, and 503 individually, and then form a composite per-cell coverage set based on the separate coverage computed for each edge 501, 502, and 503.

To begin a grid-walk sampling of an edge against grid tile 500, a determination is made whether the edge fully covers, fully uncovers, or partially covers the grid tile 500. The determination is made by first classifying the trajectory of the edge as vertical, horizontal, downward-sloping, or upward-sloping using the X and Y slopes of the edge, $x_s$ and $y_s$. Two vertices on the edge, $v_0$ and $v_1$ may be used to compute $x_s=(x_1-x_0)$ and $y_s=(y_1-y_0)$ If either slope is zero, the trajectory of the edge is either horizontal or vertical. The degenerate case where both are zero is disallowed—because the edge would have a length of zero. In general, pre-testing the three vertices of a triangle for co-linearity is sufficient to eliminate zero-area triangles. If the slopes have opposite signs, the trajectory of the edge is up sloping; otherwise, the trajectory of the edge is down sloping.

Given the trajectory of the edge, two point-edge tests may be performed and the outcomes of the two point-edge tests determines whether the grid tile 500 is fully covered, fully uncovered, or partially covered by the edge. In one embodiment, the two-point-edge tests are performed at two corners of the grid tile 500, e.g., a first corner and a second corner. For example, when the trajectory of the edge is horizontal, the two corners that are tested are the upper-left corner and the lower-left corner. If the grid tile 500 is fully covered or uncovered, then the coverage state of each cell in the grid tile 500 may be set accordingly for the edge without further testing. Otherwise, the coverage state of each cell in the grid tile 500 is undetermined the edge is walked to compute the coverage state of the cells. TABLE 1 may be used to determine the coverage state of the grid tile 500 as fully covered, fully uncovered, or undetermined.

TABLE 1

Grid Walk Sampler Stepping Rules for Traversing an Edge

| orientation | direction | 1st corner | outcome | 2nd corner | outcome | grid disposition |
|---|---|---|---|---|---|---|
| vertical ($x_s = 0$) | $y_s > 0$ | upper left | <0 | upper right | — | FUN |
| | | | >=0 | | <0 | TEST |
| | | | — | | >=0 | FCV |
| | $y_s < 0$ | | >=0 | | — | FCV |
| | | | <0 | | >0 | TEST |
| | | | — | | <=0 | FUN |
| horizontal ($y_s = 0$) | $x_s > 0$ | upper left | >=0 | lower left | — | FCV |
| | | | <0 | | >0 | TEST |
| | | | — | | <=0 | FUN |
| | $x_s < 0$ | | <0 | | — | FUN |
| | | | >=0 | | <0 | TEST |
| | | | — | | >=0 | FCV |
| down sloping (sign(xs) == sign(ys)) | $x_s > 0$ | lower left | <=0 | upper right | — | FUN |
| | | | >0 | | <0 | TEST |
| | | | — | | >=0 | FCV |
| | $x_s < 0$ | | >=0 | | — | FCV |
| | | | <0 | | >0 | TEST |
| | | | — | | <=0 | FUN |
| up sloping (sign(xs) <> sign(ys)) | $x_s > 0$ | upper left | >=0 | lower right | — | FCV |
| | | | <0 | | >0 | TEST |
| | | | — | | <=0 | FUN |
| | $x_s < 0$ | | <0 | | — | FUN |
| | | | >=0 | | <0 | TEST |
| | | | — | | >=0 | FCV |

In TABLE 1, "FUN" means the grid tile 500 is fully uncovered, "TEST" means further testing required (a grid walk), and "FCV" means the grid tile 500 is fully covered. If the grid tile 500 is fully uncovered or fully covered by an edge, the coverage state for every cell or sample in the grid tile 500 can be set or cleared without further testing.

Assuming a grid walk is required ("TEST"), the next step is to determine an entry point for an edge in the grid tile 500. Grid walking is defined as traversing a cell at a time, stepping from one cell to an adjacent cell, while staying as close to the edge as possible. A grid walk may be performed in either direction along an edge ("$v_0$" to "$v_1$", "$v_1$" to "v0", "left" to "right", etc.), or potentially in both directions simultaneously and meeting in the middle of the edge. For the remainder of this discussion, a "left to right" traversal is described for horizontal, down, and up sloping edges and a "top to bottom" (increasing Y) traversal is described for vertical edges, a single direction at a time.

Figure 5C:
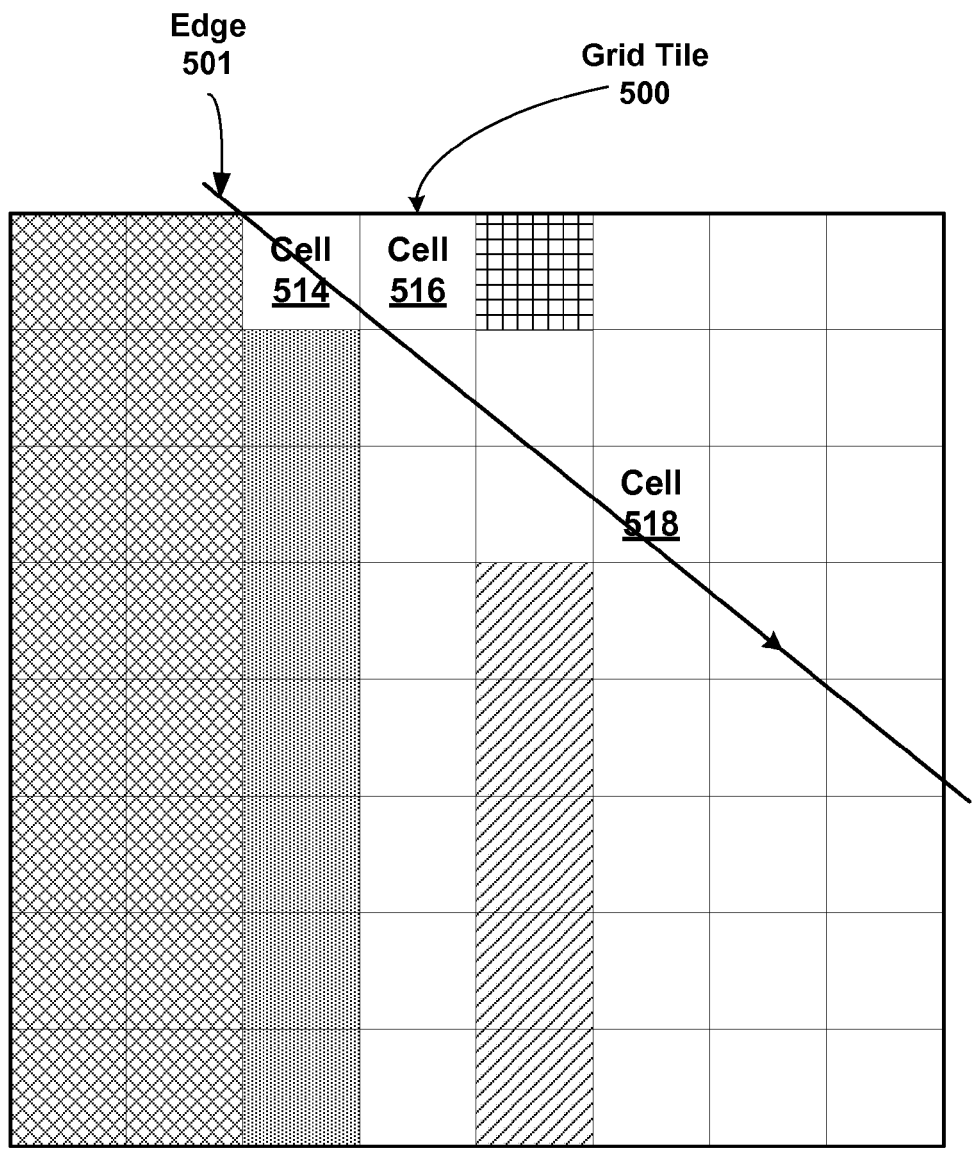
FIG. 5C illustrates a grid walk for one edge shown in FIG. 5A, according to one embodiment of the present invention.

FIG. 5C illustrates a grid walk for edge 501 shown in FIG. 5A, according to one embodiment of the present invention. The grid walk for the edge 501 begins at cell 514, where the edge 501 intersects the grid tile 500. The trajectory of the edge outside of the edge 501 and the cells to the left and below the cell 518 are inferred to be inside of the edge 501. Cells that are intersected by the edge 510, such as cells 514, 516, and 518, are partially covered cells. For conservative sampling, traversal through a cell during the grid walk identifies the cell as covered. For fine sampling, any sample point within a partially covered cell is sampled in detail to determine coverage of each sample point. Fully covered and fully uncovered cells are not sampled in detail, even for fine sampling. In other words, only cells that are traversed when an edge is walked are considered for detailed sampling and related cells (inferred as fully covered or fully uncovered) are not considered for detailed sampling.

Figure 5D:
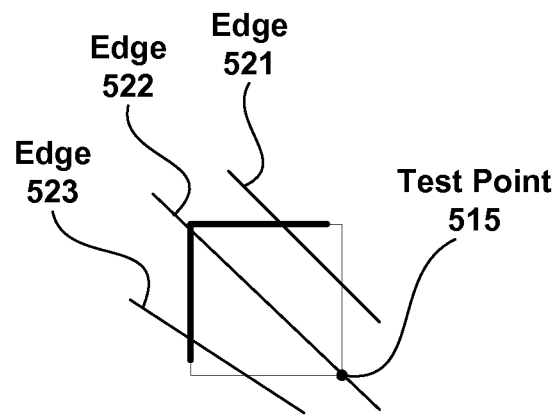
FIG. 5D illustrates upward and downward edge exits for cells, according to one embodiment of the present invention.
Figure 5D:
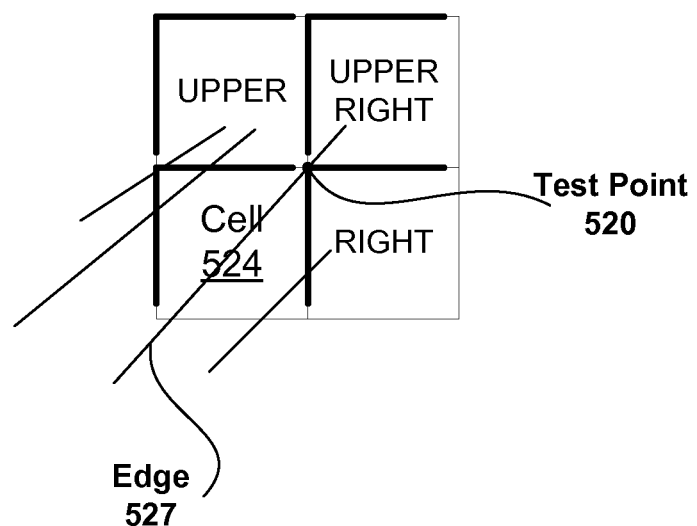

Specific rules may be defined to determine how the grid tile 500 is walked. First, FIG. 5D illustrates upward and downward edge exits for cells, according to one embodiment of the present invention. First, an entry edge along one side of the grid tile 500 is determined and then the specific cell along that side is identified to begin traversing an edge. By borrowing only the "TEST" cases from TABLE 1, and potentially adding one more test corner, the entry edge of the grid tile 500 may be determined, as shown in TABLE 2.

TABLE 2

Rules for Identifying an Entry Side of a Grid Tile

| orientation | direction | 1st corner | outcome | 2nd corner | outcome | 3rd corner | outcome | entry edge |
|---|---|---|---|---|---|---|---|---|
| vertical | ys > 0 | upper left | >=0 | upper right | <0 | — | — | top |
| (xs = 0) | ys < 0 | | <0 | | >0 | | | |
| horizontal | xs < 0 | upper left | <0 | lower left | >0 | — | — | left |
| (ys = 0) | xs > 0 | | >=0 | | <0 | | | |
| down sloping | xs > 0 | lower left | >0 | upper right | <0 | upper left | >=0 | top |
| | | | | | | | <0 | left |
| (sign(xs) == sign(ys)) | xs < 0 | | <0 | | >0 | | >=0 | left |
| | | | | | | | <0 | top |
| up sloping | xs > 0 | upper left | <0 | lower right | >0 | lower left | >0 | left |
| | | | | | | | <=0 | bottom |
| (sign(xs) <> sign(ys)) | xs < 0 | | >=0 | | <0 | | >0 | bottom |
| | | | | | | | <=0 | left |

501 is down sloping edge ($x_s$ and $y_s$ positive). By applying the right hand rule based on the winding order of the vertices indicated by the arrows, all cells to the left and below the edge 501 in the grid tile 500 must be fully covered. When the grid walk sampler is at cell 514, the cells that are to the left and below the cell 514 are inferred as being fully covered (as shown by the pattern in FIG. 5C). The cells having coverage state that is inferred are "related" cells for the on-edge cell 514. Cells directly below and to the right of the cell 514 are not related to cell 514 and are still of unknown disposition. As additional cells on the edge 501 are walked, the coverage state of the other cells can be determined.

Because the edge trajectory is down sloping, the cell 514 is exited along either its right edge, its bottom edge, or through the bottom right corner. The edge 510 cannot exit the cell 514 through either the left or top edge or any other corner of the cell 514. Therefore, testing the point at the lower right corner of each cell on the edge 501 helps determine the next cell to traverse when walking the grid tile 500. As shown in FIG. 5C, the edge 501 exits the cell 514 through the right edge of cell 514 and the next cell that is traversed is cell 516. The coverage state of cells that are related to cell 516 have coverage state that is inferred as fully covered (as shown by the pattern in FIG. 5C). Cells directly below and to the right of the cell 516 are not related to cell 516 and are still of unknown disposition. Whenever a cell to the right is traversed, additional coverage state is determined. The traversal process continues until the edge 510 exits through the right edge of the grid tile 500. When the cell 518 is reached during the grid walk, the related cells to the right and above the cell 518 are inferred to be Once an entry edge is determined, the entry cell may be identified using a binary search or a divide operation. Recall the edge equation for a line (cross product test):

$$((y1-y0)(x-x0)-(x1-x0)(y-y0))>0$$

Substituting in the symbolic slope variables produces:

$$(y_s(x-x0)-x_s(y-y0))>0$$

For an entry edge (top, bottom, or left), x (left) or y (top, bottom) is fixed and known. Inserting the known value into the edge equation, setting the equation to zero, and then solving for the one remaining unknown y or x is required. Dividing by the X or Y pitch (spacing between cells) and rounding to the nearest integer produces a cell entry point (as measured from the top left corner of the grid, "(0,0)").

In practice, the entry cell computation is simpler. For example, assume an up sloping edge enters the grid tile 500 along the left side. The edge equation for the upper left corner of the grid can be computed as:

$$ES_{ul}=y_s(x_{ul}-x0)-x_s(y_{ul}-y0)$$

If the pitch between cells is $P_y$ in the Y direction, the entry cell along that left side can be computed as:

$$y_{cell} = \left\lfloor \frac{|ES_{ul}|}{|y_s P_y|} \right\rfloor$$

Along an entry side, the edge equation must transition through zero (at the point the edge intersects the left side of the grid tile 500). Therefore, the initial edge-sum and per-cell change in edge-sum, what is referred to as delta-Y ($y_s P_y$), must be opposite in sign. Hence, the equation for the intersection point can be cast as an "0=ax+b" equation:

$$0 = |y_s P_y| \times y_{cell} - |ES_{ul}|$$

The floor for $y_{cell}$ is taken to round toward the included corner of the cell is (upper left). A similar process is involved for either the top edge or bottom edge as entry point. As was indicated before, this operation may be performed as a divide using an algorithm like SRT (Sweeney, Robertson, and Tocher) division (lookup table returning a close estimate of the quotient) or a binary search may be employed as a means computing a simple non-restoring division.

After entering a cell, a next cell to traverse is determined, unless the grid tile 500 is exited at the current cell. The grid exit test is simple; if the grid is $N_x$ by $N_y$ cells in size, incrementing through $x_{cell} = N_x$ or $y_{cell} < 0$ or $y_{cell} = N_y$ is a grid exit condition. Assuming the grid tile 500 is not exited for horizontal and vertical lines, the decision is also straightforward; exit right for horizontal (increment $x_{cell}$) and exit bottom for vertical (increment $y_{cell}$). For sloping lines, the decision is a bit more complex.

FIG. 5D illustrates edges 521, 522, and 523 intersecting a cell and a test point 515, according to one embodiment of the present invention. The trajectory for each of edges 521, 522, and 523 is down sloping. Edge 522 exits exactly through the corner of the cell while edge 521 exits through the right of the cell and edge 523 exits through the bottom of the cell. If the edge is tested at the test point 515 (located at the bottom right corner of the cell), the exit side of the cell (corner, right, or bottom) may be determined based on the trajectory of the edge.

A similar test exists for edges having up sloping trajectories except that the test point is location in the upper right corner of the cell. The exit condition rules for edges having up sloping trajectories are more complex due to corner inclusion rules. As shown in FIG. 5D, edge 527 goes exactly through the test point 520 in the upper right corner of cell 524, the corner "belongs" to the RIGHT cell, not the UPPER RIGHT cell. Therefore, if there was a fine sample exactly on the corner and if the sample resides in the RIGHT cell, the next cell to be traversed is the RIGHT cell to make sure that the sample is tested before proceeding to the UPPER RIGHT cell. When traversing a down sloping edge that goes through the bottom right corner, the same complication does not occur as that corner belongs to the diagonally opposite cell. The exit rules are summarized in TABLE 3.

TABLE 3

Rules used to determine the next cell to traverse

| orientation | direction | test corner | outcome | next cell |
|---|---|---|---|---|
| vertical ($xs = 0$) | — | — | — | RIGHT |
| horizontal ($ys = 0$) | — | — | — | BELOW |
| down sloping (sign(xs) == sign(ys)) | $xs > 0$ | lower right | $>0$ | RIGHT |
| | | | $=0$ | BELOW RIGHT |
| | | | $<0$ | BELOW |
| | $xs < 0$ | | $>0$ | BELOW |
| | | | $=0$ | BELOW RIGHT |
| | | | $<0$ | RIGHT |

TABLE 3-continued

Rules used to determine the next cell to traverse

| orientation | direction | test corner | outcome | next cell |
|---|---|---|---|---|
| up sloping (sign(xs) <> sign(ys)) | — | upper left | $=0$ | TOP |
| | $xs > 0$ | upper right | $>0$ | TOP |
| | | | $<=0$ | RIGHT |
| | $xs < 0$ | | $>=0$ | RIGHT |
| | | | $<0$ | TOP |

As the edges intersecting in the grid tile 500 are traversed, the cells that are traversed are classified as on-edge cells and the cells related to the traversed cells are also classified as interior or exterior cells, without traversing the related cells. So far, the edges have been considered to have infinite extent. However, edges in a triangle have a finite length with a start and stop point at the vertices.

Figure 5E:
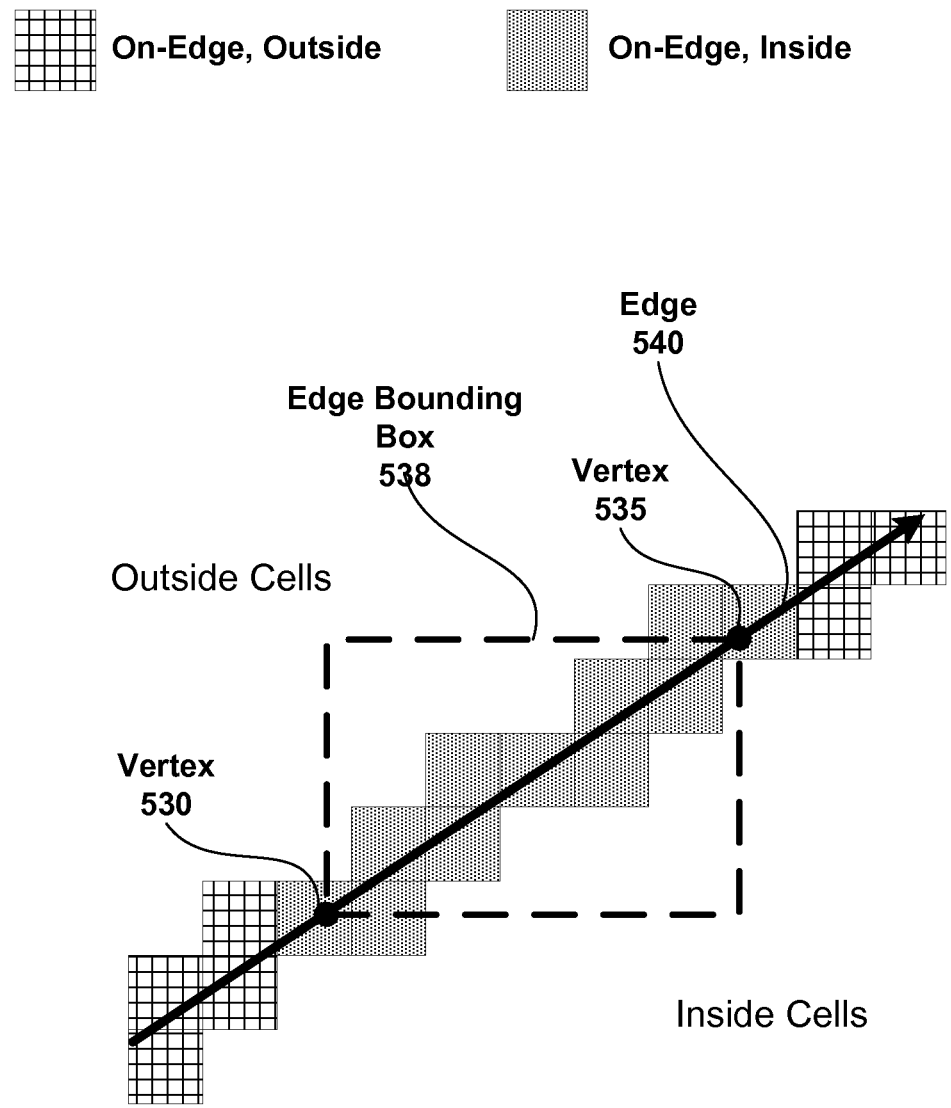
FIG. 5E illustrates an edge and a bounding box that includes the edge vertices, according to one embodiment of the present invention.

FIG. 5E illustrates an edge 540 and a bounding box 538 that includes the edge vertices 530 and 535, according to one embodiment of the present invention. The vertices 530 and 535 are used to distinguish between the on-edge inside and the on-edge outside classification for cells that are traversed. The on-edge, inside cells intersect the edge of the triangle between the two vertices 530 and 535 on the edge 540 and the on-edge, outside cells intersect the extended edge, but are outside the two vertices 530 and 535 on the edge 540. The edge bounding box 538 is created around the two vertices 530 and 535 on the edge 540 to classify the on-edge cells as on-edge, inside or on-edge outside during the edge traversal. The edge bounding box 538 is computed using the min and max of each set of vertex coordinates (x,y). At each step of the traversal, the boundary of the current cell is intersected with the edge bounding box 538. If the intersection of the boundary of the current cell with the edge bounding box 538 is null, then the current cell must be on-edge, outside.

During traversal, the edge enters the edge bounding box 538, passes through the edge bounding box 538, and then exits the edge bounding box 538. A cell that is on the edge and is outside of the bounding box 538, when the edge has not yet entered the edge bounding box 538, is in an on edge bounding box (OEB) state. When a cell intersects the edge bounding box 538 or with within the edge bounding box 538, the cell is in an on the edge and inside (OEI) state. A cell that intersects the edge bounding box 538 when the edge has exited the edge bounding box 538, the cell is in an on the edge and after (OEA) state. To distinguish between OEB versus OEA for a cell that is on-edge, outside, the min/max boundaries of the current cell are compared to the boundaries of the edge bounding box 538 and the sign of the differences will indicate which side of the edge bounding box 538 the current cell is on.

Formally, computing the intersection between an edge bounding box and a cell boundary is as follows. Define the following variables:

$x_L$=cell left edge $x_R$=cell right edge
$y_T$=cell top edge $y_R$=cell bottom edge
$x_0 = v0\ X$ $x_1 = v1\ X$
$y_0 = v0\ Y$ $y_1 = v1\ Y$ where v0 and v1 are the two vertices on edge. The boundaries of the cell are then computed as follows:

$x_{min} = \min(x_0, x_1)$ $x_{max} = \max(x_0, x_1)$
$y_{min} = \min(y_0, y_1)$ $y_{max} = \max(y_0, y_1)$ Given these definitions, the intersection of an edge bounding box with a cell may be computed as follows:

cell_
BB_intersection=$x_L \leq x_{max}$ & $x_R > x_{min}$ & $y_T \leq y_{max}$ & $y_B > y_{min}$ Once an initial state for the traversal is known, when to change states may be determined using TABLE 4.

TABLE 4

Rules describing the classification of on-edge cells

| Prior State | Cell/Edge BB Test | Next State |
|---|---|---|
| OEB | null | OEB |
|  | non-null | OEI |
| OEI | non-null | OEI |
|  | null | OEA |
| OEA | — | OEA |

During the edge walk, we assign cells on the edge as OEB, OEI, and OEA, as well as inferring related cells as interior or exterior without having had to explicitly traverse the related cells. The advantage of the grid walk sampling technique is the ability to test only a few cells (those on the edge) while inferring the coverage state for related cells based on the trajectory of the edge. After walking all three edges and calculating the state of each cell relative to each edge, the coverage state of all of the cells in the grid tile can be determined. The truth table for determining a final cell coverage state as either covered or uncovered is shown in TABLE 5.

TABLE 5

Cell classification rules for generating grid tile coverage information

| E1 State | E2 State | E3 State | Cell State | Covered? |
|---|---|---|---|---|
| I | I | I | I | Y |
| OEI | — | — | OEI | Y |
| — | OEI | — | OEI | Y |
| — | — | OEI | OEI | Y |
| E | — | — | E | N |
| — | E | — | E | N |
| — | — | E | E | N |
| OEB/OEA | !(E\|OEI) | !(E\|OEI) | OEB\|OEA | N |
| !(E\|OEI) | OEB\|OEA | !(E\|OEI) | OEB\|OEA | N |
| !(E\|OEI) | !(E\|OEI) | OEB\|OEA | OEB\|OEA | N |

In TABLE 5, "I" means "interior", "E" means "exterior." "OEB", "OEI", and "OEA" are as defined before (on edge before/inside/after). Note that for any cell, no two edges can simultaneously be "E" and "OEI" at the same time. Cells that are interior to all the edges, or that are on-and-inside (OEI) for any edge, are inside the triangle. All other cells are outside.

Computationally, coverage information for the graphics primitives may be computed through the use of two sets, nonInterior and edgeBoundary. The sets represent the cells that are any state except interior (exterior, OEB, OEI, or OEA) and those that are exactly OEI, respectively. Before walking the grid, both sets are initialized to empty. As the grid tile 500 is traversed, cells are added to the sets. For the nonInterior set, related cells are added by inference.

Figure 5F:
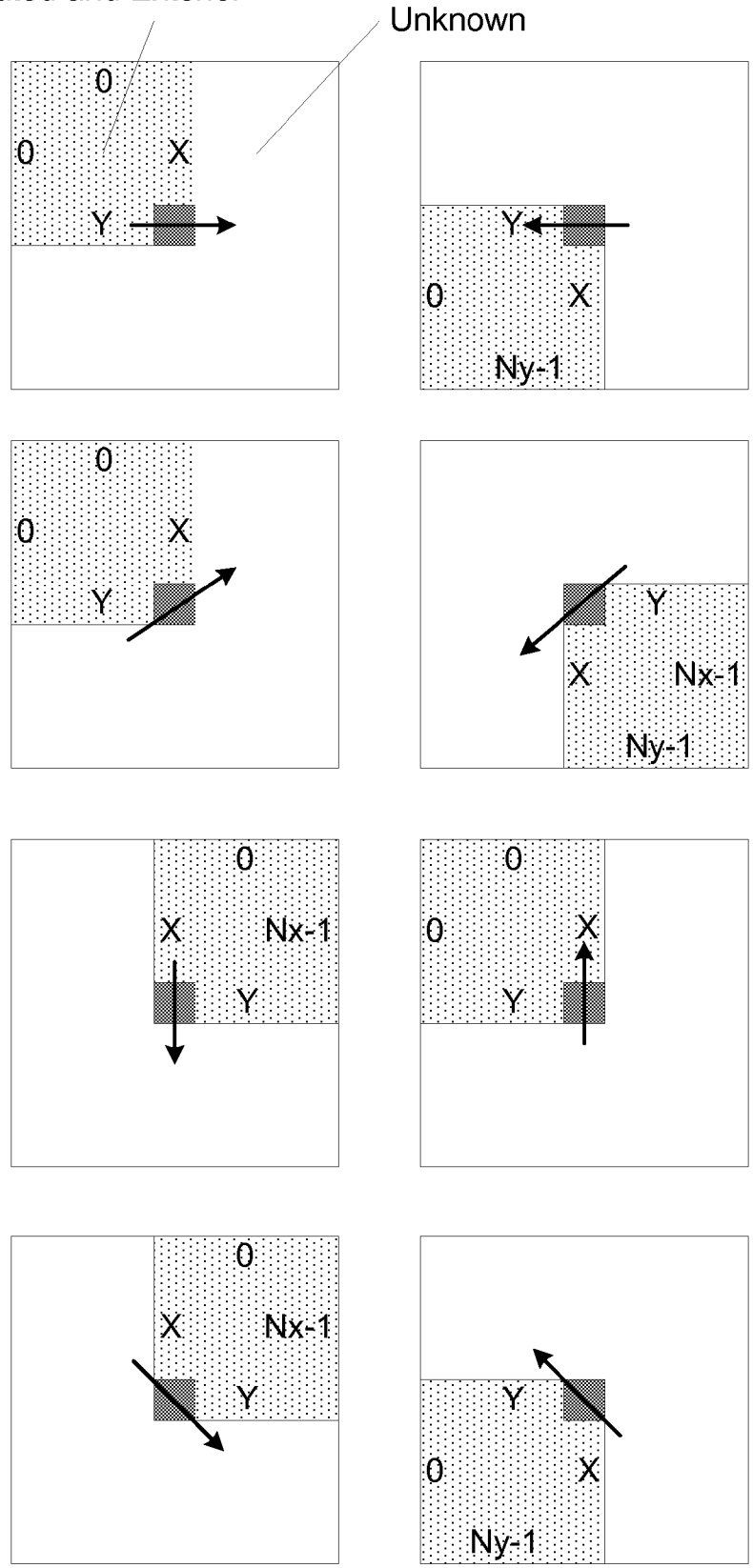
FIG. 5F illustrates related cells that are inferred to be exterior to an edge, according to one embodiment of the present invention.

FIG. 5F illustrates related cells that are inferred to be exterior to an edge, according to one embodiment of the present invention. Related cells that cannot possibly be interior based on the current on-edge cell being traversed and the edge trajectory (orientation), are shown as a rectangular region of cells (related and exterior). The related and exterior cells are added to the nonInterior set. Any on-edge cell that is traversed that is OEI is added to the edgeBoundary set.

Once the grid tile 500 has been traversed for all three edges, computing the final coverage set is straightforward, coverage=(U−nonInterior)∪edgeBoundary, where U means the universe, i.e., the set of all cells in the grid. The set difference "(U−nonInterior)" are all cells that are strictly in the interior of a triangle. The coverage sets may be implement using bit masks, in which case, the set difference is simply a complement operation and set union to compute the final coverage set is a bit-wise OR.

Summarizing, the grid walk sampling coverage algorithm:
1. Initialize two sets nonInterior and edgeBoundary to empty. If fine sampling, initialize a fineSample set to empty as well.
2. For each edge of a triangle, perform the following steps:
   a. Determine orientation and direction of edge by computing $x_s$ and $y_s$ slopes.
   b. Compute whether edge full covers or full uncovers the specified grid.
      i. If grid fully uncovered, add all cells to nonInterior and go to step 3. Note that edgeBoundary should be empty (can assert this).
      ii. If grid fully covered, go to step 3 if this is the last edge to test or restart step 2 for the next edge to process.
   c. Compute the grid side that an edge enters (top, left, or bottom depending on edge orientation).
   d. Compute the entry cell along the entry side. Compute whether edge walk is before (OEB), in between (OEI), or after (OEA) vertices on the edge (v0 and v1).
   e. Repeat the following until the grid is exited:
      i. With current edge bounding box, determine if an edge cell position (OEI or OEA) state change is warranted. Change state accordingly.
      ii. Compute exit edge of cell and next cell to visit.
      iii. Add current cell to edgeBoundary if cell is OEI. Add inferred non-interior cells to nonInterior.
      iv. If fine sampling and the current cell is OEI, test all samples in the current cell against the edge and add covered fine samples to the fineSample set.
3. Compute triangle conservative coverage set.
4. If fine sampling, for any interior (U−nonInterior) cell, all fine samples for that cell are covered and can be added to the fineSample set without testing.

Fine Sampling Algorithm

The conservative sampling algorithm can be extended to perform fine sampling with only a few simple modifications. As the grid tile 500 is traversed, the edge-sum $E_{ul}$ is maintained for each cell that is traversed. An incremental computation is performed for each traversal from one cell to the next, the step distance is exactly one cell left, up, down, or diagonally. As an example, stepping from a cell (2, 3) to a cell (3, 3) horizontally (in cell coordinates, not pixel coordinates). Define the screen space coordinates for the upper-left corner of cell (2, 3) as $(x_{c23}, y_{c23})$ and for cell (3, 3) as $(x_{c33}, y_{c33})$. From the definition of the edge-sum equation, the edge sums for cell (2, 3) and cell (3, 3) are:

$$E_{ul}^{23} = x_s(y_{c23} - y_0) - y_s(x_{c23} - x_0)$$

$$E_{ul}^{33} = x_s(y_{c33} - y_0) - y_s(x_{c33} - x_0)$$

However, since we moved horizontally, we know $y_{c23} = y_{c33}$. Thus, subtracting $E_{ul}^{23}$ from $E_{ul}^{33}$, produces the E edge-sum difference of $-y_s(x_{c33} - x_{c23})$. Since the traversal was exactly one cell to the right, the pixel distance $(x_{c33} - x_{c23})$ is known. This implies that the product $-y_s(x_{c33} - x_{c23})$ actually applies to any horizontal step and can be computed before the grid is traversed. A similar argument holds for vertical steps. Thus, maintaining $E_{ul}$ for a cell as the grid is traversed is simply an addition of one or two components to the running edge-sum.

With a running edge sum $E_{ul}$ for any cell in the grid tile, an edge sum can be computed for an exact sample location within the cell by a similar offset process. Only fine samples contained in OEI (on edge, inside) cells need to be tested for coverage as these cells are only partially covered by an edge. For the OEI cells, by computing the sub-pixel offsets from the upper left corner of the cells, appropriately scaled values of x and y derived sub-pixel edge-sum adjustments may be added to the running edge sum $E_{ul}$ for a cell to compute coverage for the sample at the sub-pixel offsets.

Recursive Subdivision Sampler

Although not a requirement, a grid walk sampler rasterization pipe may be employ recursive subdivision techniques. The general idea behind a recursive subdivision sampler is to represent either the entire screen (or in fact a superset of the screen) or a subset of the screen as a screen tile (or just a grid tile). The screen tile is divided into a set of cells which are then individually sampled. If a cell does not represent a single sample, that cell is further subdivided recursively until each cell contains a single sample. Without loss of generality, example grid tiles with a maximum size of 64 cells are used to correspond to the machine wordwidth in bits to match the bit width expected by processing engines that make use of coverage information.

A grid walk sampler-based raster process begins with the definition of a grid tree. A grid tree is a list of grid descriptors indexed by a level, levels being numbered from 0 through $g_{max}$. Level 0 is reserved for the coarsest level of grid granularity and refers to a screen tile that fully encompasses or is larger than the render target being rasterized. Higher-numbered levels are in turn subdivisions of the lower numbered levels. The grid tree terminates at level $g_{max}$, a fine sampling grid descriptor whose cells describe individual pixels or sub-pixels.

Once a grid tree is generated for a render target, rasterization can begin. For each triangle, each triangle is recursively tested against each grid descriptor level in the grid tree, beginning at level 0. Since a grid walk sampler is designed to walk a grid tile for some triangle, the grid walk sampler may be used to return a conservative rasterization of that triangle for all grids except $g_{max}$. Conservative rasterization indicates whether each cell in the grid is fully or partially covered by the triangle. For fully covered cells, finer levels of the grid tree are recursively descended, but without sampling any of the levels as the finer levels under fully covered cells are guaranteed to be fully covered. For partially covered cells, the next higher level in the tree should be sub-sampled, as the cells of the next higher level grid that are fully covered, partially covered, or uncovered is not known. As the number of sub-cells to sample from level to level can expand geometrically, the grid may be represented as a tree rather than a list.

When sampling a grid at level $g_{max}$, the fine sampling grid, grid walk sampling can be employed. For a fine sampling grid, however, the grid is first conservatively sampled and then, for any partially covered (OEI) cells, each sample point is finely sampled exactly as previously described. The result of the final sampling at the highest level of the grid is a list of samples to be rendered.

Optimizing Small Triangle Efficiencies

For small triangles (less than 10 pixels in area), employing grid walk sampling techniques using a recursive subdivision algorithm has a negative side effect. Those grids high in the grid tree—grids that encompass most of the screen—are walked inefficiently even though a small triangle is highly likely to be contained entirely within one cell of that grid. Even though the coverage set is ultimately a single cell, all of the mathematical effort testing each cell is expended as the grid is traversed. To avoid such grid traversals, a grid can be pre-tested for some triangles. This test is referred to as a "one-hot" optimization as the coverage mask defining the coverage set for a grid test will return exactly one cell.

To determine if a triangle is one-hot against some grid tile the following tests may be performed. First the bounding box of the triangle is computed, i.e., the smallest rectangle that fully encloses the triangle. The bounding box of the triangle can be computed using a small set of min-max comparisons of the vertex coordinates. Second, the triangle bounding box is tested against the grid bounding box. If the triangle bounding box is fully subsumed by the grid tile, we know that the triangle must be fully contained within the grid tile. On the other hand, if the triangle bounding box does not entirely lie inside the grid tile, at least one vertex lies outside the tile and the grid tile needs to be traversed.

Assuming that the triangle is inside the grid tile, the grid cell coordinates for the upper-left and lower-right corners of the triangle bounding box are computed. Again, if the cell coordinates for the two opposing coordinates are the same, the triangle must lie in exactly that one cell, and that grid is one-hot. If the cells are not the same, at least one pair of vertices lies in different grid cells and the grid tile needs to be traversed.

The cost to compute grid cell coordinates for the two bounding box coordinates is a set of four divide operations. The upper left screen position of the grid is known and can subtract this position from the triangle bounding box positions of upper-left and lower-right, yielding grid-relative offsets for these corners. Dividing the grid-relative offsets by the horizontal and vertical pitch between cells and then taking the floor of the quotients produces the grid cell indices, x and y. Since grid cell coordinates are small integers and the pixel distances of dividend and divisor are even smaller than those used in the previously described grid cell entry computation, these divisions may be performed with relatively low cost.

A Grid Walk Sampler Hardware Implementation

Figure 6A:
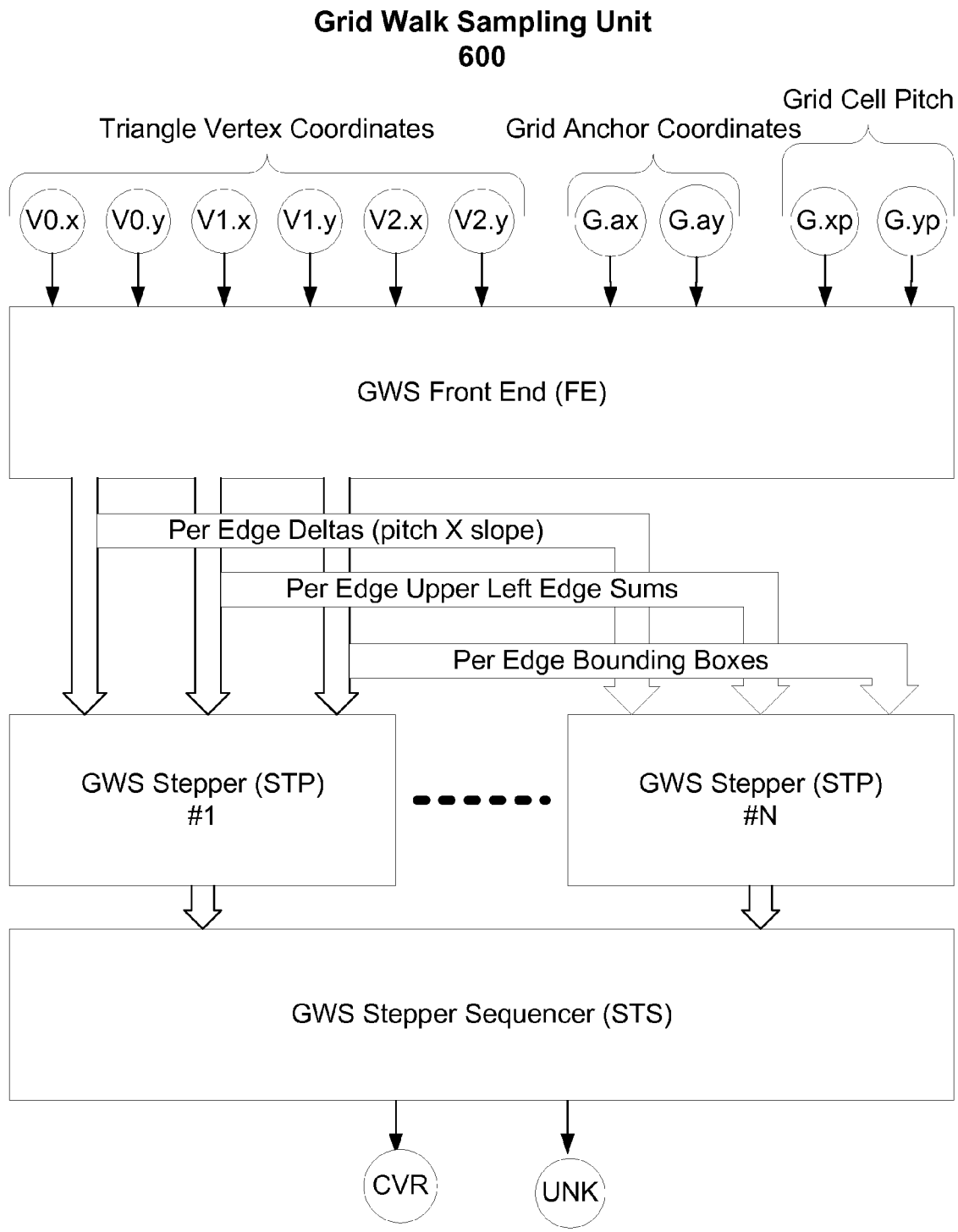
FIG. 6A is a block diagram of a grid walk sampling unit, according to one embodiment of the present invention.

FIG. 6A is a block diagram of a grid walk sampling unit 600, according to one embodiment of the present invention. The grid walk sampling unit 600 may be included within the rasterizer 322 shown in FIG. 3A or the rasterizer 455 shown in FIG. 4. Primary inputs to the grid walk sampling unit 600 include the raw triangle vertex coordinates, grid anchor coordinates, and grid cell pitch (spacing between cells). Not shown are inputs such as edge inclusion masks (does an edge include/not include a fine sample), grid tile width and height, etc. The primary outputs from the grid walk sampling unit 600 are two coverage masks, CVR and UNK. CVR reports all conservatively covered cells in the grid tile (interior cells); UNK reports cells which have unknown possible sub-coverage values (basically, all edge boundary cells).

As shown in FIG. 6A, there are three major block types: the front end (FE), one or more steppers (STP), and a final stepper sequencer block (STS). The FE is responsible for initial edge classification, grid upper-left edge-sum computations, edge slope computations, edge bounding box computations, and general grid coverage assessment. To achieve a throughput of one triangle-grid per clock, the FE should be fully pipelined and must be able to do all these computations at one per clock. The stepper blocks are grid walkers. In one embodiment, the stepper blocks are simple state machines controlling in concept a digital differential analyzer (DDA)-based grid walk data path. Steppers can process one cell walked per clock. Hence for example, for an 8×8 grid tile, an average of 8 clocks may be needed to walk the grid tile. The steppers are individually responsible for walking an edge through a grid tile and computing both partial (OEI) and non-interior cells of the grid tile for an edge. If required, the steppers also perform a fine sample test of any OEI cell so as to compute an exact coverage mask.

In order to match the throughput of the FE blocks, multiple stepper blocks are placed in parallel. Each block processes one triangle sequentially, but because there are multiple such blocks, a throughput of one triangle-grid per clock may be maintained by round-robin scheduling of the stepper blocks. The final block is the stepper sequencer (STS). Because the steppers operate in parallel, are asynchronous to each other, and may have variable execution latency (proportional to the actual number of grid cells walked), a block (STS) is needed to reassemble the outputs of the individual steppers back into the order in which triangle-grids were launched. Once the grid walk for an edge is complete, the set of OEI and non-interior cells for each edge of a triangle are merged by the STS to form a set of final coverage masks (either a pair, full and partially cell masks, or a fine coverage mask). The final coverage masks are then emitted along with grid anchor location and other grid information as output from the grid walk sampling unit 600.

Figure 6B:
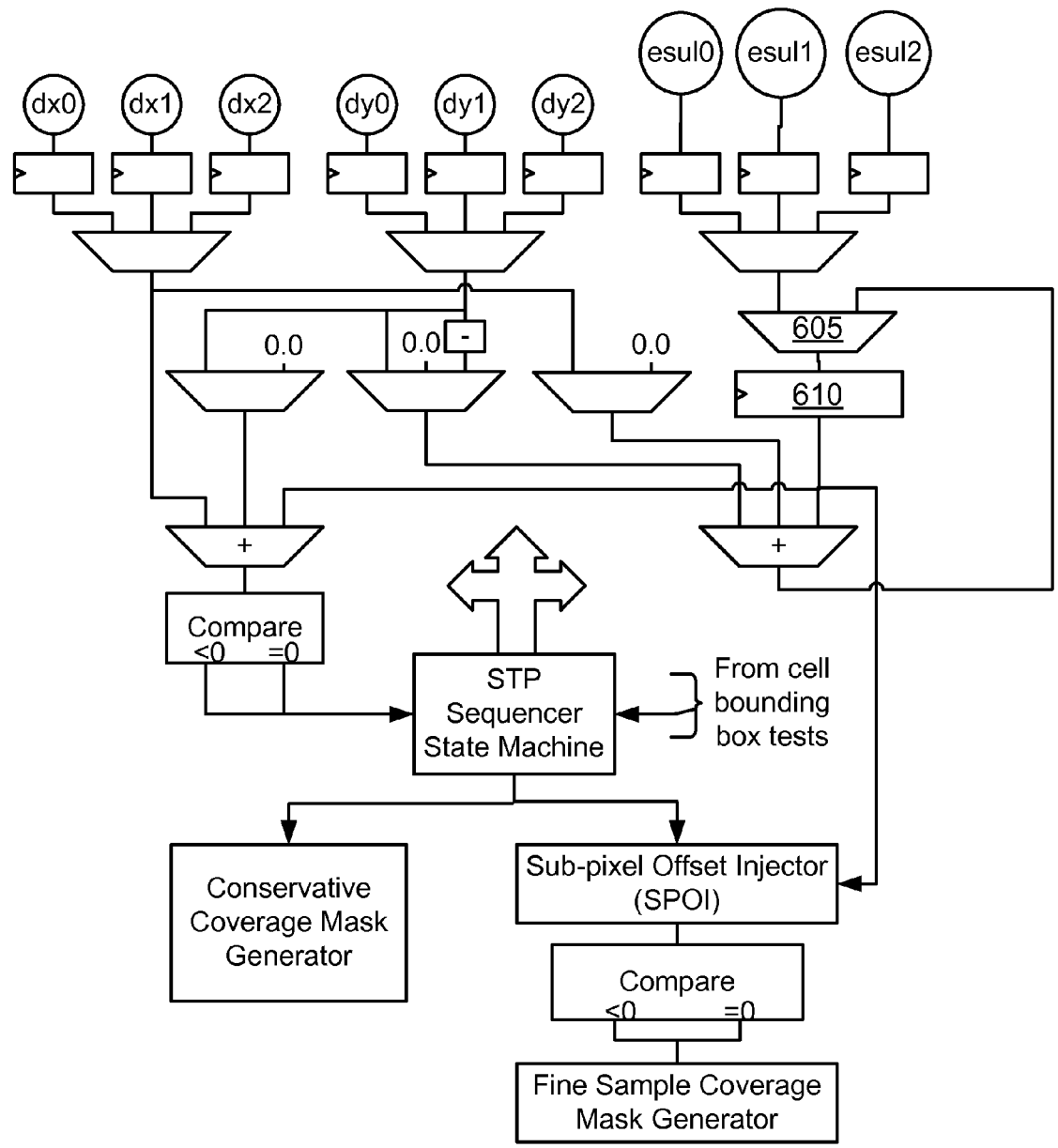
FIG. 6B is a block diagram of the stepper block from FIG. 6A, according to one embodiment of the present invention.

FIG. 6B is a block diagram of the stepper unit, according to one embodiment of the present invention. Each stepper processes grid edge walks for up to three edges for a triangle against a grid tile. As shown in FIG. 6B, the three sets of primary inputs X and Y edge-pitch values and upper-left edge-sums are arranged across the top, one set of inputs per triangle edge. Since FE computes all three sets in parallel, a set of nine flip-flops stores the edge-pitch values as the edge-pitch values are received from FE. In one embodiment, a stepper can only process one edge at a time. From the top rank of flip-flops, a set of three multiplexers chooses values for the edge currently being processed. Note, that if an edge is fully covered, the stepper ignores the edge.

On one path following the set of three multiplexers, there is a "current upper-left edge-sum" ($ES_{ul}$ for the current cell being processed) flip-flop receiving a value from a 2:1 multiplexer 605: either a new grid edge-sum is loaded, or a feedback path turning the flip-flop 610 into an edge-sum accumulator. The output of the flip-flop 610 is connected to a three-input adder. The purpose of the logic is to allow the stepper to either move leftward (add edge-pitch value $+x_s P_x$ only), downward (add edge-pitch value $+y_s P_y$ only), upward (subtract edge-pitch value $-y_s P_y$ only), or diagonally downward (add both edge-pitch values $+x_s P_x$ and $+y_s P_y$).

The decision on which direction to move to next is based on a different data path following the set of three multiplexers. In all up and down sloping cases but one, either the upper-right or lower-right corner of a cell is tested to determine an exit edge. Hence, it is only necessary to test rightward (add +x), or diagonally rightward and downward (add both edge-pitch values $+x_s P_x$ and $+y_s P_y$). In the case of a sidestep transition where an up sloping edge exits exactly through the upper-right corner of one cell, in the next cell visited, that corner will be the upper-left corner of the cell; that particular situation can be detected by simply testing the edge-sum accumulator for zero (logic not shown). For horizontal and vertical edges, no testing is required as the direction to step is fixed.

Below the accumulator and corner-test paths are three major function blocks: a stepper sequencer state machine, a conservative coverage generator, and a fine coverage generator data path. The sequencer controls stepping of the up to three edges through the block. Feeding the sequencer are edge-corner test results and edge bounding box comparison results. Not shown are other miscellaneous inputs such as the grid coverage state of each edge, etc.

On average, only max(X,Y), or for "square" grids, $\sqrt{N}$ cells need be traversed by the grid walk sampler, where X and Y are the grid tile dimensions and N=XY. Furthermore, when traversing a grid tile, only one "full" edge-sampler unit is needed per edge (to compute the upper left corner edge-sum for the grid); all remaining edge-sums may be computed as fixed (arithmetic) additions to the initial edge-sum. The reduction in the sampling circuitry complexity compared with conventional highly parallel rasterizers results in a further savings in hardware for grid walk sampler architectures. For 8×8 grids for example, to maintain a throughput of 64 fine samples per clock, only three "full" edge-sum blocks and 8 steppers (which each have only 4 adders and one SPOI block each) are needed to rasterize a triangle per clock cycle. The grid walk sampler may be implemented using dedicated circuitry, as described in conjunction with FIGS. 6A and 6B. Alternatively, the grid walk sampler may be implemented as a shader program for execution by the GPCs 208.

Figure 7:
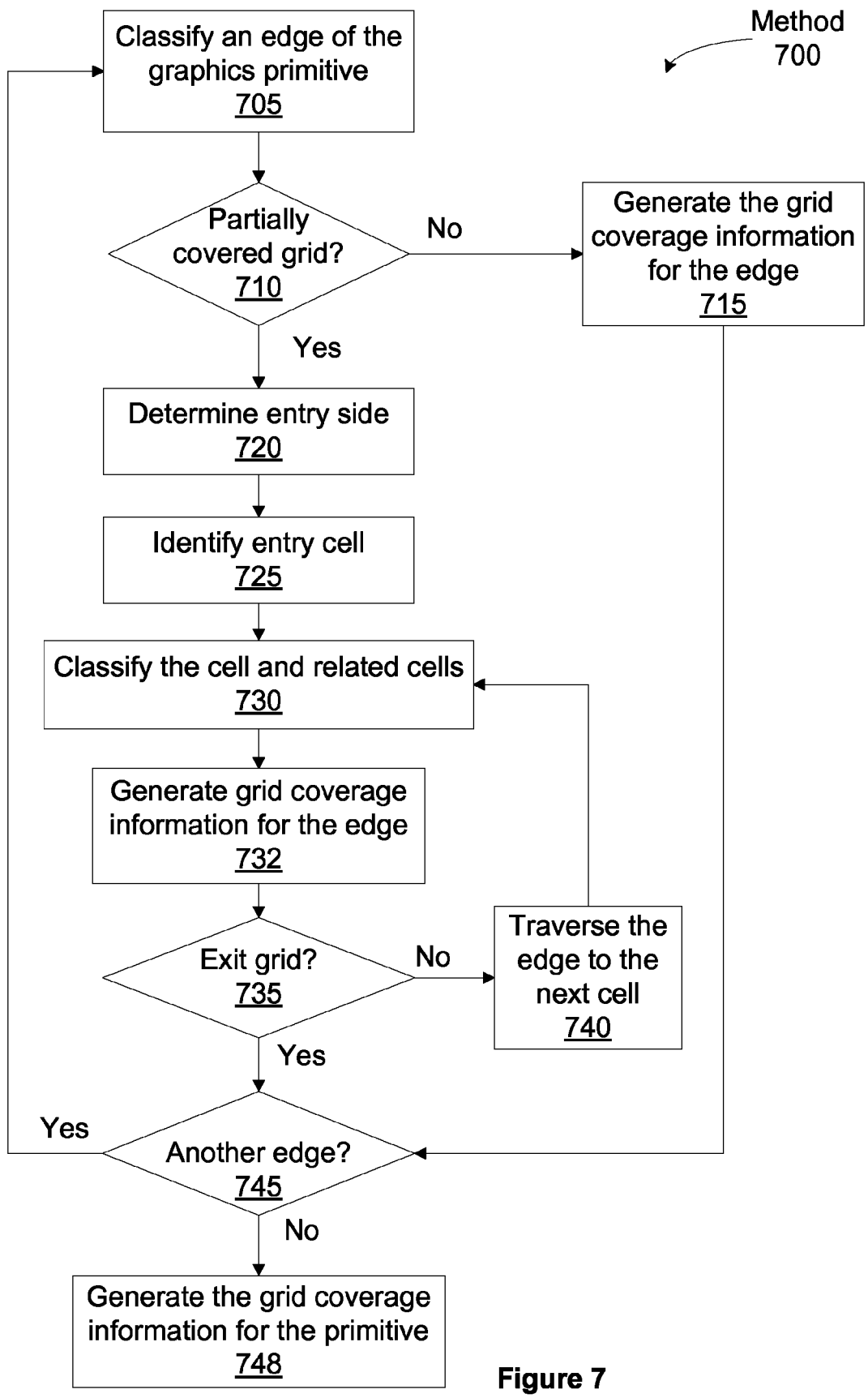
FIG. 7 sets forth a flow diagram of method steps describing the grid walk sampling technique, according to one embodiment of the present invention.

FIG. 7 sets forth a flow diagram of method steps 700 describing the grid walk sampling technique, according to one embodiment of the present invention. Although the method steps are described in conjunction with the systems of FIGS. 1, 2, 3A, 3B, 4, 6A, and 6B, persons of ordinary skill in the art will understand that any system configured to perform the method steps 700, in any order, is within the scope of the inventions.

At step 705 the grid walk sampler (the grid walk sampling unit 600 or a shader program executed by one or more GPCs 208) classifies an edge of a graphics primitive as vertical, horizontal, downward sloping, or upward sloping based on the x and y slopes, $x_s$ and $y_s$. At step 710 the grid walk sampler performs two point-edge tests to determine whether the grid tile (sampling grid) is fully covered or partially covered. If, at step 710, the grid tile is fully covered (not partially covered), then at step 715 the grid walk sampler generates the grid coverage information for the edge. A single coverage mask for the edge may be generated indicating that all samples in the grid tile are covered by the edge. In one embodiment, a nonInterior mask indicating that the no samples are exterior (or outside of) the graphics primitive and an edgeBoundary mask indicating that no samples are on the edge of (and partially covered by) the graphics primitive are generated.

If, at step 710, the grid tile is partially covered (not fully covered), then at step 720 the grid walk sampler identifies the side of the grid tile (top, bottom, left, or right) where the edge enters the grid tile (as described in conjunction with TABLE 2). The entry side may be determined based on the two point-edge tests and a third test to differentiate between upward and downward sloping edges. At step 725, the grid walk sampler identifies a first cell within the grid tile where the edge of the graphics primitive enters the grid tile. The entry cell may be identified by computing a location where the edge equation is zero at the entry side of the grid tile. At step 730, the grid walk sampler classifies the first cell as an on-edge cell and classifies one or more cells in the grid tile that are related cells to the first cell. The related cells are classified as either interior cells or exterior cells based on a trajectory of the edge, where interior cells reside entirely inside the edge and exterior cells reside entirely outside the edge. The on-edge cell is classified as either on-edge interior or on-edge exterior based on an intersection of the first cell and the edge bounding box (as described in conjunction with TABLE 4 and FIG. 5E).

At step 732 the grid walk sampler generates the grid coverage information for the edge resulting from traversing the first cell and the related cells. A single coverage mask for the edge may be generated indicating the related cells that are interior for the edge and that the first cell is partially covered by the edge. In one embodiment, a nonInterior mask that indicates the exterior cells is updated for the related cells and an edgeBoundary mask that indicates cells on the edge of (and partially covered by) the graphics primitive is updated for the first cell.

At step 735 the grid walk sampler determines if the edge exits the grid tile when the edge exits the cell. If, at step 735, the grid walk sampler determines that edge does not exit the grid tile at the cell, then at step 740 the grid walk sampler traverses the edge to a next cell in the grid tile before repeating step 730 for the next cell along the edge. A technique for determining the next cell is described in conjunction with TABLE 3. If, at step 735, the grid walk sampler determines that edge does exit the grid tile at the cell, then at step 745 the grid walk sampler determines if another edge should be traversed for the graphics primitive, and, if so, the grid walk sampler returns to step 705. Otherwise, at step 748, the grid walk sampler generates the grid coverage information for the primitive by combining the grid coverage information computed for each one of the edges of the graphics primitive (as described in conjunction with TABLE 6). A single coverage mask for the graphics primitive may be generated indicating the samples in the grid tile that are covered by the graphics primitive. In one embodiment, a nonInterior mask and an edgeBoundary mask may be generated indicating cells in the grid tile that are exterior to the graphics primitive and cells in the grid tile that are partially covered and on an edge of the graphics primitive, respectively. The partially covered and on-edge cells may be processed to generate per-sample coverage information for fine sampling.

In sum, the grid walk sampling technique efficiently samples graphics primitives by testing the intersection of triangle edges against a grid of screen space cells. Coverage of some cells within the grid by a graphics primitive is inferred as the edges of the graphics primitive are walked to identify cells along the edges that are at least partially covered by the graphics primitive. Thus, coverage testing of every cell in the grid is avoided so power consumption is reduced compared with a technique that tests every cell. The grid walk sampling technique is efficient for both large and small graphics primitives and lends itself to a parallel circuit implementation that can be scaled to increase rasterization performance.

The grid walk sampling technique is an efficient sampling algorithm aimed at optimizing the cost of triangle rasterization for modern graphics workloads. The grid walk sampling technique is an efficient mechanism to rasterize both conservatively and fine sample triangles. In addition, the architecture for a grid walk sampler allows features such as non-uniform fine sample offsets or even programmable sub-pixel offsets. Triangles are rasterized using fewer computations and simpler computations compared with conventional highly parallel rasterizers. Therefore, a rasterizer employing grid walk sampling may compute sample coverage of triangles more efficiently in terms of power and circuitry die area compared with conventional highly parallel rasterizers.

Coverage Caching

The edge coverage information that is generated during rasterization of an edge may be cached for reuse when the edge is a shared edge between two adjacent graphics primitives. The edge coverage information may be generated using the grid walk sampling technique or a different technique that also produces at least edge coverage information along edges having samples that are only partially covered by the graphics primitive.

Figure 8A:
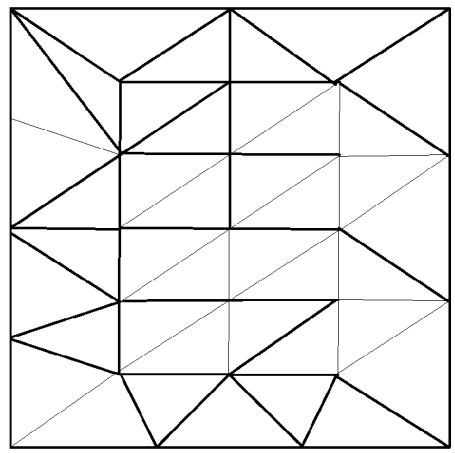
FIG. 8A illustrates a prior art triangle mesh with adjacent graphics primitives sharing edges.
Figure 8B:
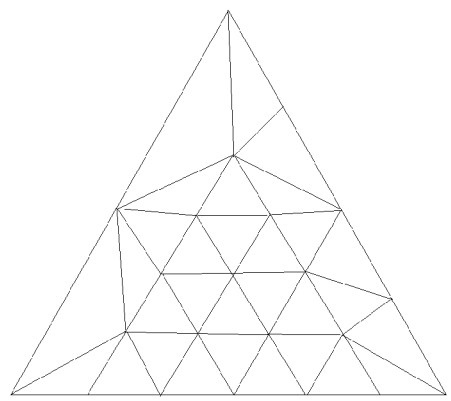
FIG. 8B illustrates another prior art triangle mesh with adjacent graphics primitives sharing edges.

FIG. 8A illustrates a prior art triangle mesh with adjacent graphics primitives sharing edges and FIG. 8B illustrates another prior art triangle mesh with adjacent graphics primitives sharing edges. Notice that almost all edges in the triangles meshes are shared by two triangles. For such shared edges, both triangles will evaluate the same edge equation twice (with inverted sign) for many sample locations. Caching the coverage information computed for shared edges improves the efficiency of rasterizing graphics primitives of topologies having shared edges, e.g., meshes, strips, fans, and the like.

Figure 8C:
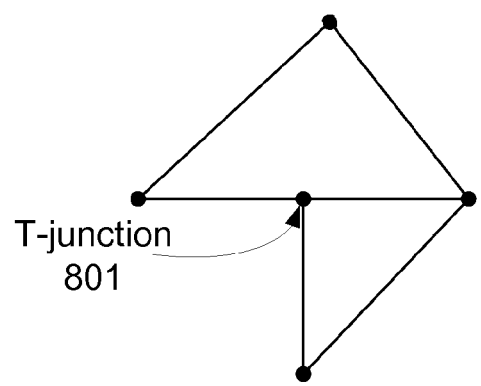
FIG. 8C illustrates prior art adjacent triangles sharing an edge at a T-junction.

Some mesh topologies allow edges to form T-junctions. FIG. 8C illustrates prior art adjacent triangles sharing an edge at a T-junction 801. Caching edges for T-junctions in a manner that allows for reuse is complex and is not addressed in the following description. For purposes of the following description, the shared edges are assumed to be edges that are entirely common to two adjacent graphics primitives, such as the shared edges shown in FIGS. 8A and 8B, not edges formed by a T-junction.

Hardware tessellation functionality that is available current and future graphics processors is likely to generate even denser meshes with more frequent edge-sharing. For example, the triangular mesh shown in FIG. 8B has 30 triangles which would normally imply 90 edges, yet only there are only 51 total unique edges. Current-generation graphics processors already exploit the redundancy of shared edges by storing vertex attributes in VABs. Consequently, modern applications programming interfaces (APIs) and games are tuned to specify mesh topologies having graphics primitives with shared edges (and shared vertices) to benefit from vertex attribute caching. In one example, 100,000 vertex-pairs were analyzed, counting an edge as unique only if the vertex-pair for the edge was observed once. On average, only approximately 1.7 unique edges were counted per triangle, indicating an opportunity to benefit from caching the coverage information for the shared edges.

Figure 8D:
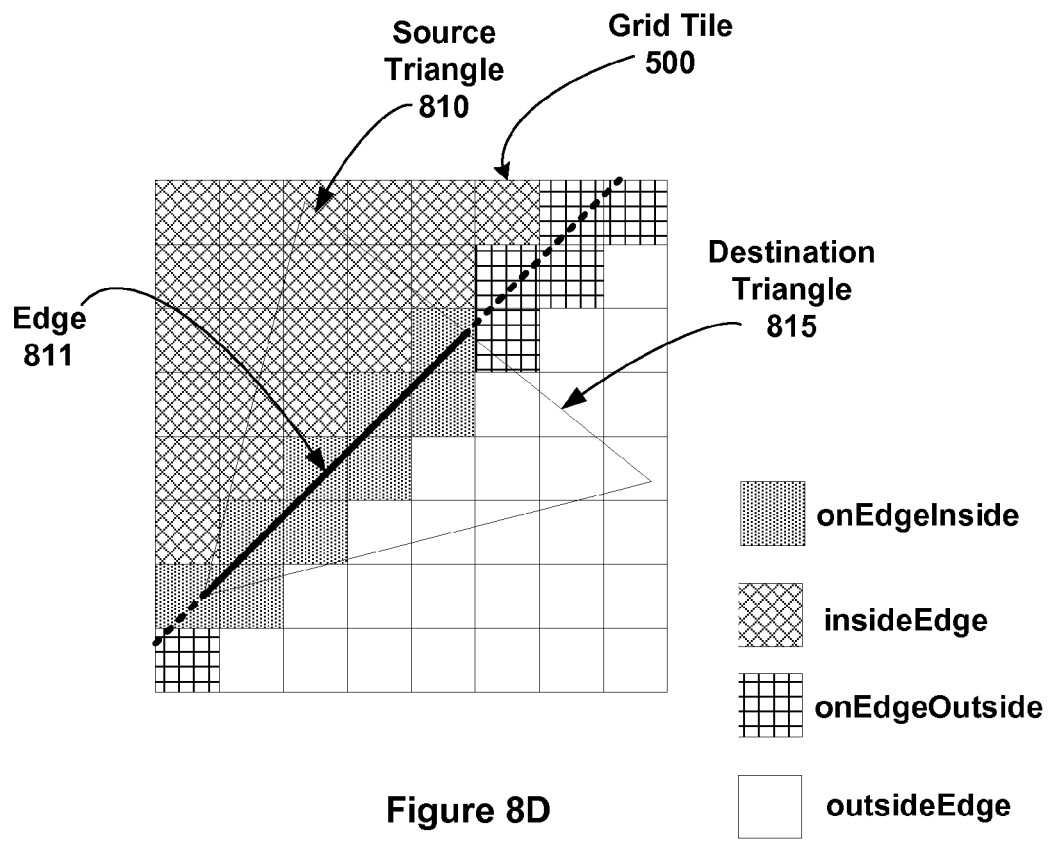
FIG. 8D illustrates a grid tile intersected by a shared edge between adjacent graphics primitives, according to one embodiment of the present invention.
Figure 8E:
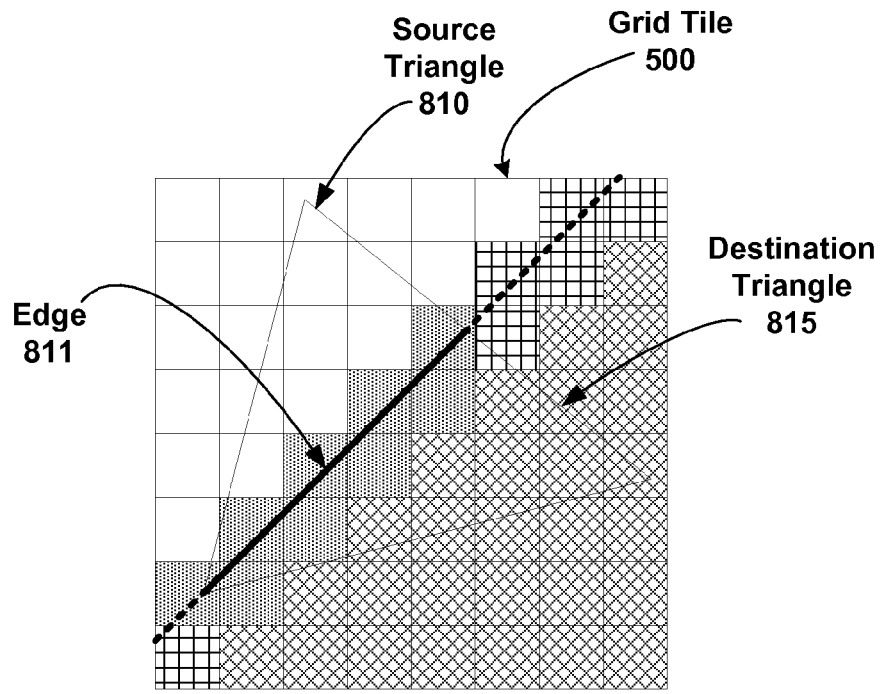
FIG. 8E illustrates the grid tile intersected by the shared edge between adjacent graphics primitives, according to one embodiment of the present invention.

FIGS. 8D and 8E illustrate the grid tile 500 intersected by a shared edge 811 between adjacent graphics primitives, a source triangle 810 and a destination triangle 815, according to one embodiment of the present invention. The cells that are classified as inside of the edge 811 for the source triangle 810 as shown in FIG. 8D are classified as outside of the edge 811 for the destination triangle 815, as shown in FIG. 8E. Similarly, the cells that are classified as outside of the edge 811 for the source triangle 810 as shown in FIG. 8D are classified as inside of the edge 811 for the destination triangle 815, as shown in FIG. 8E. Cells that are classified as on-edge inside and on-edge outside for the edge 811 are the same for both the source triangle 810 and the destination triangle 815. Therefore, the classification of the cells for the edge 811 when one of the source triangle 815 or the destination triangle 815 is rasterized can be used to infer the classification for the edge 811 when the other one of the source triangle 815 or the destination triangle 815 is rasterized for the same grid tile without actually classifying the cells directly. In other words the coverage information for the edge 811 of the destination triangle 815 (or the source triangle 810) can be derived from the coverage information for the edge 811 that was computed for the source triangle 810 (or the destination triangle 815).

As previously described, the grid walk sampling technique generates two sets of per-triangle coverage information: nonInterior and onEdgeInside. The coverage information may be represented as masks with one-bit for each cell or sample within a grid tile 500. The nonInterior set is the union of all EXT, OEI, OEB, and OEA cells, and the onEdgeInside set contains the OEI cells. Maintaining the two sets of edge coverage information as per-triangle rather than per-edge is sufficient for computing coverage for graphics primitive rasterization. However, in order to reuse coverage information for shared edges, the per-edge coverage information is needed. In embodiment, the onEdgeInside and outsideEdge coverage information is cached. In another embodiment the onEdgeInside and insideEdge coverage information is cached, wherein the insideEdge coverage information is the inverse of the outsideEdge coverage information. The onEdgeInside coverage information indicates all cells in the grid tile 500 that are intersected by the edge 811 and are only partially covered by the source triangle 810 and the destination triangle 815, i.e., the OEI (on-edge inside) cells. The outsideEdge coverage information indicates the cells in the grid tile 500 that are outside the edge 811 for either the source triangle 810 or the destination triangle 815, i.e., the EXT (exterior) cells.

Formally, the set $\mathbb{U}$ is defined as all the cells in the grid tile 500 and the following coverage information is defined for some edge e for some triangle T (as shown in FIGS. 8D and 8E):

$$\text{outsideEdge}(T,e) = \{\text{cells external to edge } e\}$$

$$\text{onEdgeInside}(T,e) = \{\text{cells on edge } e, \text{inside}\}$$

$$\text{onEdgeOutside}(T,e) = \{\text{cells on edge } e, \text{outside}\}$$

$$\text{insideEdge}(T,e) = \{\text{cells interior to edge } e\}$$

The following coverage information may be generated during rasterization:

$$\text{nonInterior}(T) = \mathbb{U} - \bigcap_{\forall e} \text{insideEdge}(T, e)$$

$$\text{onEdgeInside}(T) = \bigcup_{\forall e} \text{onEdgeInside}(T, e)$$

The coverage information for a shared edge $e_s$, is stored in a cache when a first triangle is rasterized so that the coverage information can be read from the cache instead of being recomputed when a second triangle that shares the edge is rasterized. Let $T_s$ be the source triangle 810, i.e., the triangle which provides the precomputed coverage information, and $T_d$ be the destination triangle 815, i.e., the triangle for which coverage information is being generated. The relationships between the coverage information corresponding to the shared edge 811 for the source triangle 810 and the destination triangle 815 is represented as:

$$\text{insideEdge}(T_d, e_s) = \text{outsideEdge}(T_s, e_s)$$

$$\text{onEdgeInside}(T_d, e_s) = \text{onEdgeInside}(T_s, e_s)$$

Typically, the nonInterior(T) is not computed as the difference between the set of all cells and the intersection of interior cells, but as a running sum of all non-interior cells, as shown by the following equations:

$$\text{nonInterior}(T, e) = \text{onEdgeInside}(T, e) \cup$$
$$\text{onEdgeOutside}(T, e) \cup$$
$$\text{outsideEdge}(T, e)$$

$$\text{nonInterior}(T) = \bigcup_{\forall e} \text{nonInterior}(T, e)$$

The non-interior sets of the two triangles are related in the following manner:

$$\text{nonInterior}(T_d, e_s) = \mathbb{U} - \text{outsideEdge}(T_s, e_s)$$

Referring back to FIG. 8D, the cells of the grid tile 500 that are outside of the edge 811 with respect to $T_s$ become the inside cells for $T_d$, as shown in FIG. 8E. Thus, any cell that is not outside for $T_s$ is non-interior (or outside) for $T_d$. This relationship may only be applied to "bi-directional shared edges".

Figure 8F:
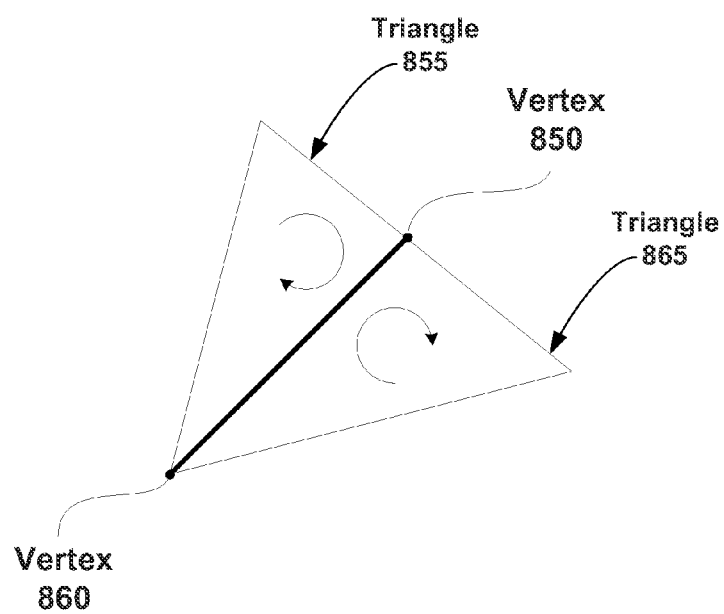
FIG. 8F is a diagram of a bi-directional shared edge, according to one embodiment of the present invention.

FIG. 8F is a diagram of a bi-directional shared edge, according to one embodiment of the present invention. The bi-directional shared edge is defined by the vertex 850 and vertex 860. Both triangles that share the bi-directional edge are "front facing" and the shared edge has opposite winding directions for the two triangles. A co-directional edge is an edge is shared between a back facing triangle and a front facing triangle (not shown). The direction for a co-directional shared edge is the same for both triangles and cells that are outside for one triangle are not the cells that are inside for the other triangle. However, co-directional edges are significantly rare in comparison to bi-directional shared edges.

In one embodiment, the shared edge coverage information onEdgeInside(T, e) and outsideEdge(T, e) may be cached using edge-grid indices as hash values. That is, the shared edge coverage information is uniquely defined by a combination of vertex-pairs identifying the edge, a grid location (anchor) of the grid tile 500, and a size dimension of the grid tile 500. One embodiment takes advantage of pointers and indices to the hash values. For example, a graphics rendering engine may represent vertex locations as ordered pairs of X/Y coordinates. If the ordered pairs are stored as a list in memory, a pair of indices into the list is sufficient to uniquely identify a triangle edge. If the list is not excessively long, a relatively few number of bits may be used to encode edges. For example, if 1024 vertices are stored at any one time, then 20 bits suffices to describe a pair of vertices.

Edge identification may be further optimized by encoding edge direction into the identifier: the first edge vertex is represented with a first index and the second vertex is represented with an index offset from (i.e., relative to) the first index. For example, for the triangle 855 shown in FIG. 8F, the shared edge has the first vertex 850 and the second vertex 860. If vertex 850 is indexed in the vertex list as i1 and vertex 860 is indexed in the vertex list as i2, then the shared edge may be represented as the pair "i1:(i2−i1)," where (i2−i1) is the index offset of the vertex 860 from the vertex 850. In most practical applications, such an offset is short and can be encoded in a very few bits. Using the prior example of a 1024 vertex list, perhaps only 4-5 bits are needed to represent the offset, which means only 14-15 bits are required (instead of 20) to represent an edge. Note that the offset is taken according to the winding order such that the edge for the triangle 855, from vertex 850 to vertex 860 will not match the edge for the triangle 865 from vertex 860 to vertex 850 ("i2:(i1−i2)" versus "i1:(i2−i1)"). Thus, caching will only match on edges having the correct and intended winding order.

Similarly, caching will only match grid tile anchor locations for edges within the same grid tile 500. Sampling grids, such as grid tile 500, are defined by an anchor location (by convention, the upper left corner of a grid tile in screen space) and a grid size (cells wide by cells tall by spacing X/Y between cells). A grid size may be specified by a structure stored in memory, and such structures may be kept in a small list. For example, if five or so grid descriptions are needed to recursively process sampling across a screen, only 3 bits of a grid size index are needed to uniquely describe a specific grid size. Given some grid size, the number of such grids mapped to a screen buffer is also constrained. For example, if the smallest grid is 4×4 pixels, a 2048×1024 screen has 128K which requires only 17 bits to encode. In one embodiment the grid size and anchor are Huffman-encoded and only the finest grid levels require a 17-bit index while coarser levels require fewer bits. Hence, the combination of grid size index and grid tile anchor location (20 bits in this example) uniquely specifies a particular grid tile 500. A combination of a first vertex index and an index offset, the grid size index, and the grid tile anchor location may be used as a cache tag.

Figure 8G:
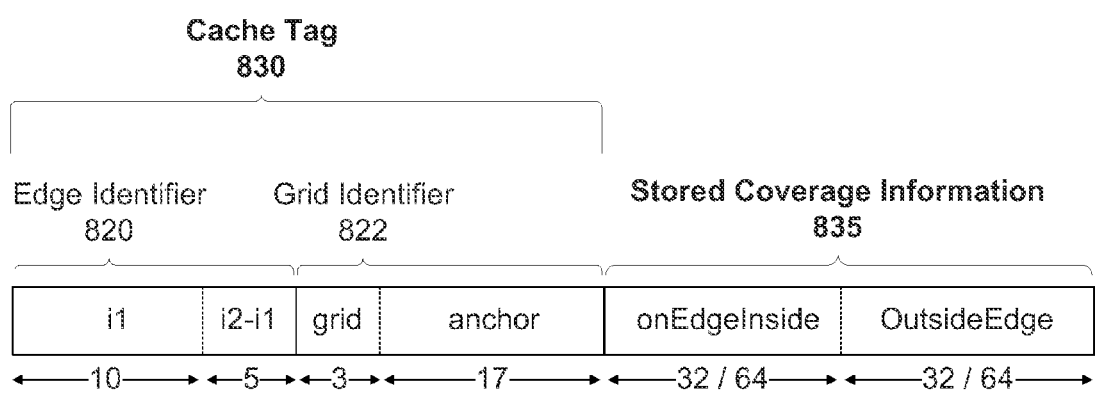
FIG. 8G is a diagram of a cache line including a cache tag and stored coverage information, according to one embodiment of the present invention.

FIG. 8G is a diagram of a cache line including a cache tag 830 and stored coverage information 835 for an edge, according to one embodiment of the present invention. The edge vertex-pair index (i1) and index offset (i2–i1) form an edge identifier 820 that occupies 14-15 bits. The grid size index (grid) and the grid tile anchor location (anchor) form a grid identifier 822 that occupies 20 bits. The edge identifier 820 combined with the grid identifier 822 form a sampler-edge-grid cache tag. The sampler-edge-grid tag is associated with the stored coverage information 835 for an edge that includes onEdgeInside(T, e) and outsideEdge(T, e). A cache read tag is computed for a grid tile 500 and a vertex-pair for an edge. When a cache tag matches the computed cache read tag, the coverage information for the edge has been pre-computed and is stored in the cache line associated with the cache tag.

Figure 9A:
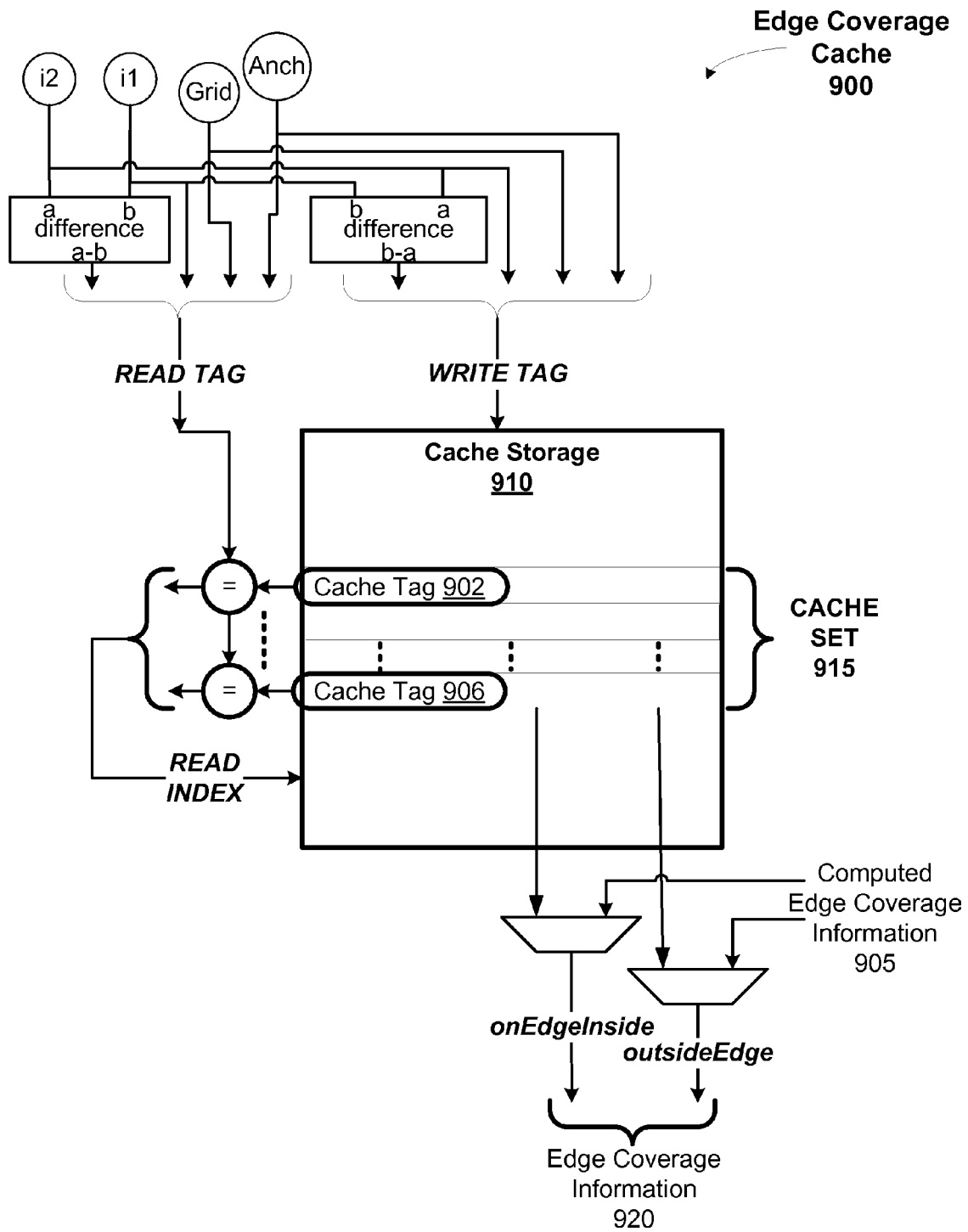
FIG. 9A is a block diagram of a edge coverage cache, according to one embodiment of the present invention.

FIG. 9A is a block diagram of an edge coverage cache 900, according to one embodiment of the present invention. As shown in FIG. 9A, the edge index values i1 and i2 for the edge along with the grid size index (grid) and the grid anchor location (anch) for the grid tile 500 are inputs to the edge coverage cache 900. Two difference arithmetic logic units, one to compute the forward edge index distance for reading, one to form the reverse edge distance for writing, feed from the i1 and i2 inputs. The forward "READ TAG" is used to both index the coverage storage 910 and provide a matching tag for the cache tags in the cache storage 910 (the hash function and read indexing logic is not shown). A cache set 915 (anywhere from just one entry (direct mapped cache) all the way to all entries (fully associative cache)) is read as a result. If a cache hit occurs, i.e., the READ TAG matches a cache tag, such as the cache tag 902 or 906, the corresponding stored coverage information for an edge (onEdgeInside and outsideEdge) are supplied as the edge coverage information 920 output of the edge coverage cache 900.

On a cache miss, i.e., the READ TAG does not match a cache tag, and the grid walk sampler is used to compute the edge coverage information that is by the edge coverage cache 900 as the edge coverage information 920. In addition, the computed edge coverage information 905 is written to some cache line using the reverse "WRITE TAG" as an index (and hashed accordingly). The logic to pick a replacement candidate in the cache and write the new cache line with the computed edge coverage information 905 is not shown.

The efficiency of the edge coverage cache 900 was measured by simulating a software implementation using a few modern game traces. For the simulation, one embodiment of the edge coverage cache 900 was designed as a fully-associative cache with a FIFO replacement policy, and cache entries constructed as described previously (but without using offset indices to identify edges). The resulting data suggests that a small cache with 32-64 entries could reduce the rasterizer load to 75% of the original. Also, since trivial edge-grid pairs (fully covered, fully uncovered, grids lying outside an edge) were not cached, the 25% reduction is a significant amount of work saved.

Figure 9B:
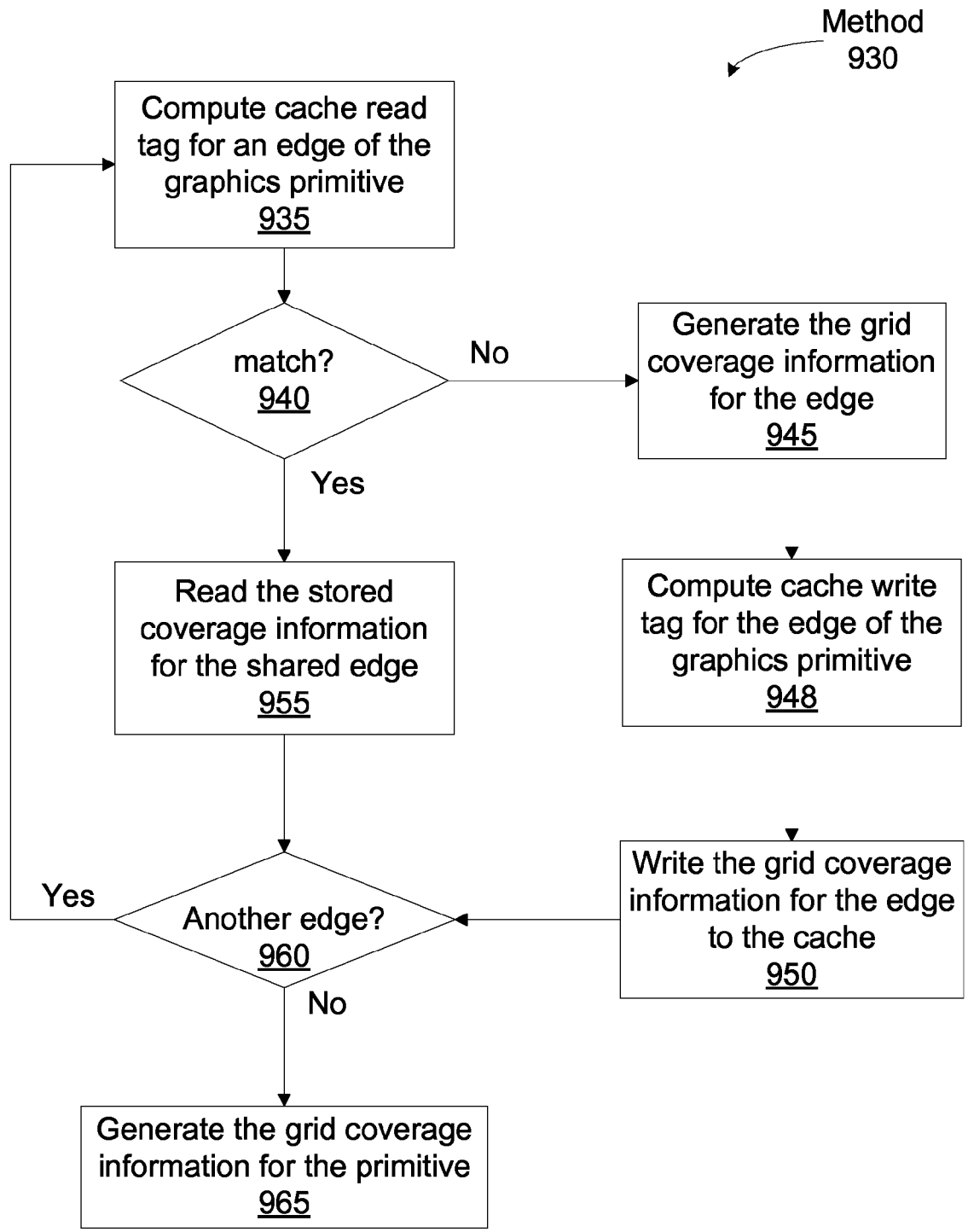
FIG. 9B sets forth a flow diagram of method steps describing caching of edge coverage information, according to one embodiment of the present invention.

FIG. 9B sets forth a flow diagram of method steps 930 describing caching of edge coverage information, according to one embodiment of the present invention. Although the method steps are described in conjunction with the systems of FIGS. 1, 2, 3A, 3B, 4, 6A, 6B, and 9A persons of ordinary skill in the art will understand that any system configured to perform the method steps 930, in any order, is within the scope of the inventions. At step 935 the edge coverage cache 900 computes a cache read tag for a first edge of a first graphics primitive based on an grid identifier 822 associated with a sampling grid tile 500 positioned in screen space and an edge identifier 820 associated with the first edge. At step 940 the edge coverage cache 900 determines if the cache read tag matches a tag associated with a cache line of the cache storage 910, i.e., if there is a cache hit. If, at step 940, there is a cache hit, then at step 955 the edge coverage cache 900 reads stored coverage information 835 for the first edge from the matching cache line. The stored coverage information 835 was pre-computed during rasterization of another (previously processed) graphics primitive that shared the first edge with the first graphics primitive.

If, at step 940, there is not a cache hit, i.e., there is a cache miss, then at step 945 the grid coverage information for the edge is computed by the grid walk sampler or other rasterizer that is configured to generate at least onEdgeInside coverage information and either insideEdge or outsideEdge coverage information. At step 948 the edge coverage cache 900 computes a cache write tag for the edge of the first graphics primitive. At step 950, the edge coverage cache 900 writes the cache write tag and the computed grid coverage information for the first edge to a cache line of the cache storage 910 to produce the cache tag 830 and the stored coverage information 835.

At step 960 the grid walk sampler determines if another edge should be traversed for the graphics primitive, and, if so, the grid walk sampler returns to step 935. Otherwise, at step 965, the grid walk sampler generates the grid coverage information for the primitive by combining the grid coverage information computed or read from the edge coverage cache 900 for each one of the edges of the graphics primitive.

In sum, during rasterization of a first graphics primitive coverage information is generated that (1) indicates cells within a sampling grid that are entirely outside an edge of the first graphics primitive and (2) indicates cells within the sampling grid that are intersected by the edge and are only partially covered by the first graphics primitive. The coverage information for the edge is stored in a cache. When a second graphics primitive is rasterized that shares the edge with the first graphics primitive, the coverage information is read from the cache instead of being recomputed. Triangles are rasterized using fewer computations and simpler computations compared with conventional highly parallel rasterizers. Therefore, a rasterizer employing a edge coverage information cache may compute sample coverage of triangles more efficiently in terms of power and circuitry die area compared with conventional highly parallel rasterizers that do not cache edge coverage information.

The edge coverage information caching technique advantageously stores the coverage information for edges that are shared between adjacent graphics primitives to avoid rasterizing shared edges more than once. Consequently, power consumed during rasterization may be reduced compared with conventional highly parallel rasterization techniques. The caching technique is efficient for both large and small graphics primitives and lends itself to a parallel circuit implementation that can be scaled to increase rasterization performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writeable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writeable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for caching graphics primitive edge coverage information, the method comprising:
   computing a cache read tag for a first edge of a first graphics primitive based on a grid identifier associated with a sampling grid positioned in screen space and an edge identifier associated with the first edge;
   determining that the cache read tag matches a cache line; and
   reading stored coverage information for the first edge from the cache line, wherein the first edge is shared by the first graphics primitive and a second graphics primitive.

2. The method of claim 1, wherein the stored coverage information indicates cells within the sampling grid that are partially covered by the second graphics primitive.

3. The method of claim 1, wherein the stored coverage information indicates cells within the sampling grid that reside outside the first edge for the second graphics primitive.

4. The method of claim 1, wherein the cache read tag encodes a trajectory of the first edge.

5. The method of claim 1, wherein the cache read index encodes two vertices that define the first edge.

6. The method of claim 1, wherein the cache read index encodes a location of the sampling grid in screen space and a size of the sampling grid.

7. The method of claim 1, wherein the stored coverage information indicates cells within the sampling grid that reside inside the first edge for the first graphics primitive.

8. The method of claim 1, further comprising, prior to computing the cache read tag for the first edge of the first graphics primitive:
   computing a cache write tag for the first edge; and
   writing the stored coverage information for the first edge to the cache line, wherein the stored coverage information was computed while rasterizing the second graphics primitive.

9. The method of claim 1, further comprising combining coverage information for the first edge and coverage information for additional edges of the first graphics primitive to produce coverage information for the first graphics primitive.

10. The method of claim 1, wherein the first edge comprises a bi-directional shared edge between the first graphics primitive and the second graphics primitive.

11. A processing subsystem, comprising:
    a cache configured to:
       compute a cache read tag for a first edge of a first graphics primitive based on a grid identifier associated with a sampling grid positioned in screen space and an edge identifier associated with the first edge;
       determine that the cache read tag matches a cache line stored in the cache; and
       read coverage information for the first edge from the cache line, wherein the first edge is shared by the first graphics primitive and a second graphics primitive.

12. The processing subsystem of claim 11, wherein the stored coverage information indicates cells within the sampling grid that are partially covered by the second graphics primitive.

13. The processing subsystem of claim 11, wherein the stored coverage information indicates cells within the sampling grid that reside outside the first edge for the second graphics primitive.

14. The processing subsystem of claim 11, wherein the cache read tag encodes a trajectory of the first edge.

15. The processing subsystem of claim 11, wherein the cache read index encodes two vertices that define the first edge.

16. The processing subsystem of claim 11, wherein the cache read index encodes a location of the sampling grid in screen space and a size of the sampling grid.

17. The processing subsystem of claim 11, wherein the stored coverage information indicates cells within the sampling grid that reside entirely inside the first edge for the first graphics primitive.

18. The processing subsystem of claim 11, wherein, prior to computing the cache read tag for the first edge of the first graphics primitive, the cache is further configured to:
    receive the coverage information for the first edge, wherein the coverage information for the first edge was generated during rasterization of the second graphics primitive;
    compute a cache write tag for the first edge; and
    write the coverage information for the first edge to the cache line to produce the stored coverage information for the first edge.

19. The processing subsystem of claim 11, wherein the first edge comprises a bi-directional shared edge between the first graphics primitive and the second graphics primitive.

20. A computing system, comprising:
    a processing subsystem comprising a cache configured to:
       compute a cache read tag for a first edge of a first graphics primitive based on a grid identifier associated with a sampling grid positioned in screen space and an edge identifier associated with the first edge;
       determine that the cache read tag matches a cache line stored in the cache; and
       read coverage information for the first edge from the cache line, wherein the first edge is shared by the first graphics primitive and a second graphics primitive.

* * * * *